US008197171B2

(12) United States Patent
Wagner et al.

(10) Patent No.: US 8,197,171 B2
(45) Date of Patent: Jun. 12, 2012

(54) APPARATUS FOR LOADING AND UNLOADING A TRAY OF A FREEZE DRYING PLANT AND METHOD THEREOF

(75) Inventors: Alexander Wagner, Lohra (DE); Ralf Battenberg, Fronhausen (DE)

(73) Assignee: Accurro GmbH (DE)

( * ) Notice: Subject to any disclaimer, the term of this patent is extended or adjusted under 35 U.S.C. 154(b) by 939 days.

(21) Appl. No.: 12/175,957

(22) Filed: Jul. 18, 2008

(65) Prior Publication Data

US 2009/0025251 A1 Jan. 29, 2009

(30) Foreign Application Priority Data

Jul. 23, 2007 (DE) ......................... 10 2007 034 197

(51) Int. Cl.
*B65G 47/66* (2006.01)

(52) U.S. Cl. ........................... 414/180; 34/236; 414/806

(58) Field of Classification Search .................. 414/180, 414/214, 806; 34/236, 284
See application file for complete search history.

(56) References Cited

U.S. PATENT DOCUMENTS 6,206,173 B1 * 3/2001 Gallet ........................... 198/434
7,343,696 B2 * 3/2008 Covert ............................. 34/92
7,621,508 B2 * 11/2009 Wagner et al. ................ 254/372
7,695,230 B2 * 4/2010 Selch ............................ 414/180
7,762,383 B2 * 7/2010 Damen ......................... 198/429
7,766,152 B2 * 8/2010 Damen .................... 198/370.07
2006/0263179 A1 * 11/2006 Selch ....................... 414/222.01

FOREIGN PATENT DOCUMENTS

EP 0429348 A1 5/1991
EP 0618417 A1 10/1994
EP 1619459 A1 1/2006

* cited by examiner

*Primary Examiner* — Charles A Fox

(74) *Attorney, Agent, or Firm* — Hanley, Flight & Zimmerman, LLC

(57) ABSTRACT

Disclosed is an apparatus for loading and unloading a tray of a freeze drying plant with a number of vials. An example apparatus includes a transfer table upstream of the freeze drying plant for receiving temporarily said vials and a pusher apparatus for displacing said vials between said transfer table and said tray. The pusher apparatus includes right and left transport carriages and a loading element. With the example apparatus, the vials are securely transferred with little friction onto/from the tray, and the transport carriages are disposed on the transfer table and/or on the tray to form a lateral limitation of the transfer table and/or of the tray for the vials located on the edge of the transfer table and/or of the tray to directly abut a transport carriage during loading or unloading.

21 Claims, 30 Drawing Sheets

APPARATUS FOR LOADING AND UNLOADING A TRAY OF A FREEZE DRYING PLANT AND METHOD THEREOF

CROSS-REFERENCE TO RELATED APPLICATIONS

This application claims Priority from German Application No. DE 10 2007 034 197.2 filed on Jul. 23, 2007.

FIELD OF THE DISCLOSURE

The present disclosure relates to an apparatus for loading and unloading a tray of a freeze drying plant as set forth in the preamble of the claims 1 and 2, as well as to a method for a respective one thereof, according to the preamble of the claims 16 and 17.

The material to be dried in a freeze drying plant is filled into small bottles which are referred to as vials and transported with the help of said vials. Lids are provided on these vials and are closed upon completion of the freeze drying process.

The vials, which are filled with the material to be freeze dried and whose lid is still open, are brought onto a transfer table from where they are conveyed to a tray in the interior of the freeze drying plant by means of a pusher apparatus. In the freeze drying plant there are provided a plurality of trays, which, for loading the freeze drying plant, are taken from a stack, raised to the height of the transfer table and loaded with the vials. Once the tray is filled, said tray is moved upward together with the already previously filled trays and the next tray is taken from the stack and brought to the level of the transfer table, and so on. Upon completion of the freeze drying process, the trays are brought together in such a manner that the tray located above the vials comes to rest on the lids of the vials which it pushes into the vials so that the vials are henceforth closed. Then, the trays are again pulled apart for the tray located on the height of the transfer plate to be unloaded. As soon as this tray has been unloaded, it is brought to the bottom of the freeze drying plant where it is stacked whilst the next tray is moved to the level of the transfer table in order to be unloaded, and so on.

BACKGROUND OF RELATED ART

A device for loading and unloading a tray of a freeze drying plant is known from EP 1 619 459 A1, the pusher apparatus thereof including a bar that is adapted for upward and downward pivotal movement and that is retained on a carriage guided on the right and on the left side of the transfer table and on the tray. The carriages are guided on special rails which are attached to the right and left edge of the transfer plate and of the tray. The rails are configured to be a web protruding upwards at right angles and concurrently forming a lateral limitation for the vials located on the transfer table or on the tray.

To load the tray with a number of vials, said vials are at first placed onto the transfer table. As soon as there are enough vials on the table, the bar retained on the carriages is brought to the foremost vials, a flexible metal tape being attached to a respective one of the right and left carriages and being actuated through a drive. Then, the bar is moved further in the direction of the tray, thus pushing the vials in front of it. The rails, which act as a side limitation, hereby ensure that no vials will fall down from the transfer table or from the tray. As soon as the foremost vials have been placed onto the tray, the metal tapes pull the carriages, and as a result thereof the bar, back into the initial position before the bar is pivoted away upward through a pivoting mechanism mounted to the carriage for the next vials to be passed underneath the bar and be placed onto the transfer plate. At the same time, the now filled tray is moved upward in the freeze drying plant and the next, empty tray is provided. If enough vials are on the transfer table, this process is repeated and the pusher device pushes the next group of vials onto the next tray.

For unloading, the bar is again travelled upward through the pivoting mechanism and, through the flexible tapes, is brought together with the carriage as far as the rear edge of the tray where the bar is lowered again. Then, the tapes are pulled tight again, thus pulling the carriage and the bar together with the vials from the tray onto the transfer table from where the vials are then evacuated.

Upon pushing the vials from the transfer plate onto the tray, it may happen that the vials, which had originally been placed correctly in discrete rows, get disarranged, some vials also being brought as far as the rail confining them laterally. If the number of vials continues to be pushed onto the tray, the outer vials are caused to touch the rail, the vials getting even more disarranged due to the occurring friction. Some vials may also tumble.

Upon completion of the freeze drying process, the pusher apparatus is moved as far as the rear border of the tray by means of the carriages guided on the rails. Often, the carriage needs to push vials located close to the rail slightly aside in order to arrive at the rear end of the tray. Hereby, the vials are even further disarranged and discrete vials can tumble.

During unloading, the vials are now at first pushed together in analogous fashion in the opposite direction and are moved from the tray onto the transfer table. Again, a friction occurs between the outer vials and the rail confining the sides so that the vials get even more disarranged and that a vial may tumble.

Moreover, it happens that some vials get stuck on the underside of the tray located above after the freeze drying process. If now the pusher device is introduced with the bar into the freeze drying plant, the bar hits the vials sticking on the underside of the next tray; as they fall down, these vials can tip over.

Food or drugs are often processed in freeze drying plants. As a result, the hygiene requirements are very demanding. As a result, tipped over vials are not allowed to be processed further and constitute scrap material.

SUMMARY

In view thereof, it is the object of the present disclosure to provide an apparatus and a method of the type mentioned herein above for the vials to be transferred with little friction and securely to the tray and back.

As a first technical solution to this object, an apparatus for loading and unloading a tray of a freeze drying plant having the features of claim 1 and a method of loading and unloading a freeze drying plant having the features of claim 16 are proposed. Advantageous developments of this apparatus will become apparent from the respective dependent claims.

An apparatus for loading and unloading a tray of a freeze drying plant configured in accordance with this technical teaching and a method for loading and unloading a tray of a freeze drying plant configured in accordance with this technical teaching have the advantage that a side boundary is provided by positioning the transport carriage on the right and left border of the transfer table or of the tray, which prevents the vials from falling down. It is particularly advantageous to place the transport carriages for the vials located on the border to directly abut the transport carriage during loading and unloading.

Taking into consideration that the vials are moved into the freeze drying plant or out of it together with the transport carriages, the vials can be well guided by the transport carriages serving as side boundaries. Taking further into consideration that the transport carriages and the vials are moved in the same direction, it appears that the relative velocity between the transport carriages and the vials is minimized by virtue of this arrangement. Advantageously, the vials move at the same speed as the transport carriages so that the relative velocity is reduced to zero. This offers the advantage that between the vials located on the border and the transport carriages there is no friction so that they are prevented from inadvertently tipping over, which generates less scrap and thus improves the efficiency of the freeze drying process.

Moreover, it is thus achieved that the vials remain in the order in which they were placed so that each vial stays in an exactly defined position before and after unloading. Through this concrete positioning of the vials, it is possible to better control the freeze drying process since only the quality of the products contained in the vials will allow to draw conclusions on the freeze drying process. If it is found out for example that always the vials in a certain position have insufficient freeze drying quality, the freeze drying method can be improved in this point with the aim of reducing the generated scrap material.

Still another advantage is that, for quality control, only those vials must be examined, which were on critical positions on the tray in order to see the overall quality of the freeze drying process. Accordingly, the number of random samples can be reduced, whilst the examination result is improved.

As a second technical teaching to this solution, an apparatus for loading and unloading a tray of a freeze drying plant having the features of claim 2 and a method of loading and unloading a freeze drying plant having the features of claim 17 are proposed. Advantageous developments of this apparatus will become apparent from the respective dependent claims.

An apparatus for loading and unloading a tray of a freeze drying plant configured in accordance with this technical teaching and a method for loading and unloading a tray of a freeze drying plant configured in accordance with this technical teaching have the advantage that, by displacing the transport carriages transverse to the travel direction, a distance can be created between the transport carriage and the vials. This offers the advantage that the transport carriages can be brought close to the vials located on the edge of the transfer table or on the edge of the tray during direct loading or unloading for example, meaning during a sliding travel, for a good guidance of the vials so that no vials will tip over and that the vials remain in the existing order and sequence whilst the transport carriages are moved at a distance from the vials, for example during a movement in which the vials are not being displaced, meaning during an empty run, in order to avoid contact with the vials so that no vials will tip over during the empty run and that the vials remain in the existing order and sequence.

In a preferred embodiment, a guide element is disposed here on the right and the left edge of the transfer table and/or of the tray, for the transport carriage to rest thereon. This guide element is placed so that the transport carriage resting thereon serves for laterally delimiting the transfer table and/or the tray. It has been found advantageous to have the guide element extend as far as the rear edge of the tray for the transport carriage, in particular the pusher chain, to be correctly guided over its entire length and to prevent it from inadvertently sliding partially away or falling down.

In a particularly preferred embodiment, a guiding groove is formed on the guide element, a downward extending guiding pin mounted to the underside of the transport carriage extending into said groove. This offers the advantage that the guiding pin interlockingly prevents the transport carriage from sliding out of place laterally.

In a preferred developed implementation, the guide element is retained on the transfer table and/or on the tray for lateral displacement by about 1 mm to 10 mm, preferably by 4 mm. This offers the advantage that these guide elements can be moved readily at low cost, such as pneumatically, electrically or hydraulically.

In an alternative preferred embodiment, an inner groove and an outer groove are formed in the guide element, a downward extending guide pin being formed on the underside of the transport carriage for engagement into the inner or into the outer groove, depending on the situation. It has proved advantageous to arrange the inner groove and the outer groove parallel to each other.

A thus configured guide element has the advantage that the transport carriage resting on the guide element is shape-matingly secured from sliding laterally out of place by the guide pin guided in the inner or in the outer groove. The transport carriage is thereby free to move forward and backward in the direction of movement since the inner groove and the outer groove, which are also oriented in the direction of movement, do not constitute any obstacle in this direction but do constitute an obstacle in a direction transverse to the direction of movement so that the transport carriage is secured from sliding laterally out of place.

In a preferred developed implementation, at least two connecting grooves are provided between the inner groove and the outer groove. As a result, it is possible for the transport carriage to be transferred with its guide pin from the inner groove into the outer groove for example insofar as the guide pin is guided through the respective one of the connecting grooves and vice versa. This offers the advantage that the transport carriage can be guided both in the inner and in the outer groove, depending on the case of application. As a result, the transport carriage is moved at a distance from the vials during an empty run.

In another preferred developed implementation, at least two, preferably eight, guide pins are provided on the underside of the transport carriage in order to reliably avoid unwanted lateral displacement of the transport carriage over its entire length. The connecting grooves are thereby arranged such that the guide pins are located in the region of the connecting grooves when the transport carriage has been extended. As a result, the transport carriage can be readily displaced, through the respective connecting grooves, for example from the inner groove, into the outer groove and vice versa.

The transport carriage can be configured to be either a rod or a pusher chain.

In another preferred embodiment, a centering apparatus is disposed in the freeze drying plant, behind the tray to be loaded, for taking hold of the head of a transport carriage. This offers the advantage that the transport carriage, or at least part thereof, can be reliably transferred into the respective other groove. If the transport carriage is configured to be a pusher chain, the centering apparatus only displaces the head of the pusher chain and some of the chain links adjoining said head. On the opposite side, the pusher chain, together with some adjoining chain links, are displaced by the drive of the pusher chain, a more or less large central region remaining to a more or less large extent inside the output groove. If the pusher chain is again caused to move out of the freeze drying plant, the pusher chain pulls itself straight by itself.

Further advantages of the apparatus of the disclosure for loading and unloading a tray of a freeze drying plant and of the methods of the disclosure for loading and unloading a tray of a freeze drying plant will become apparent in the appended drawings and in the following description of embodiments thereof. Likewise, the disclosure lies in each and every novel feature or combination of features mentioned above or described herein after. The embodiments discussed herein are merely exemplary in nature and are not intended to limit the scope of the disclosure in any manner.

DETAILED DESCRIPTION

Figure 1A:
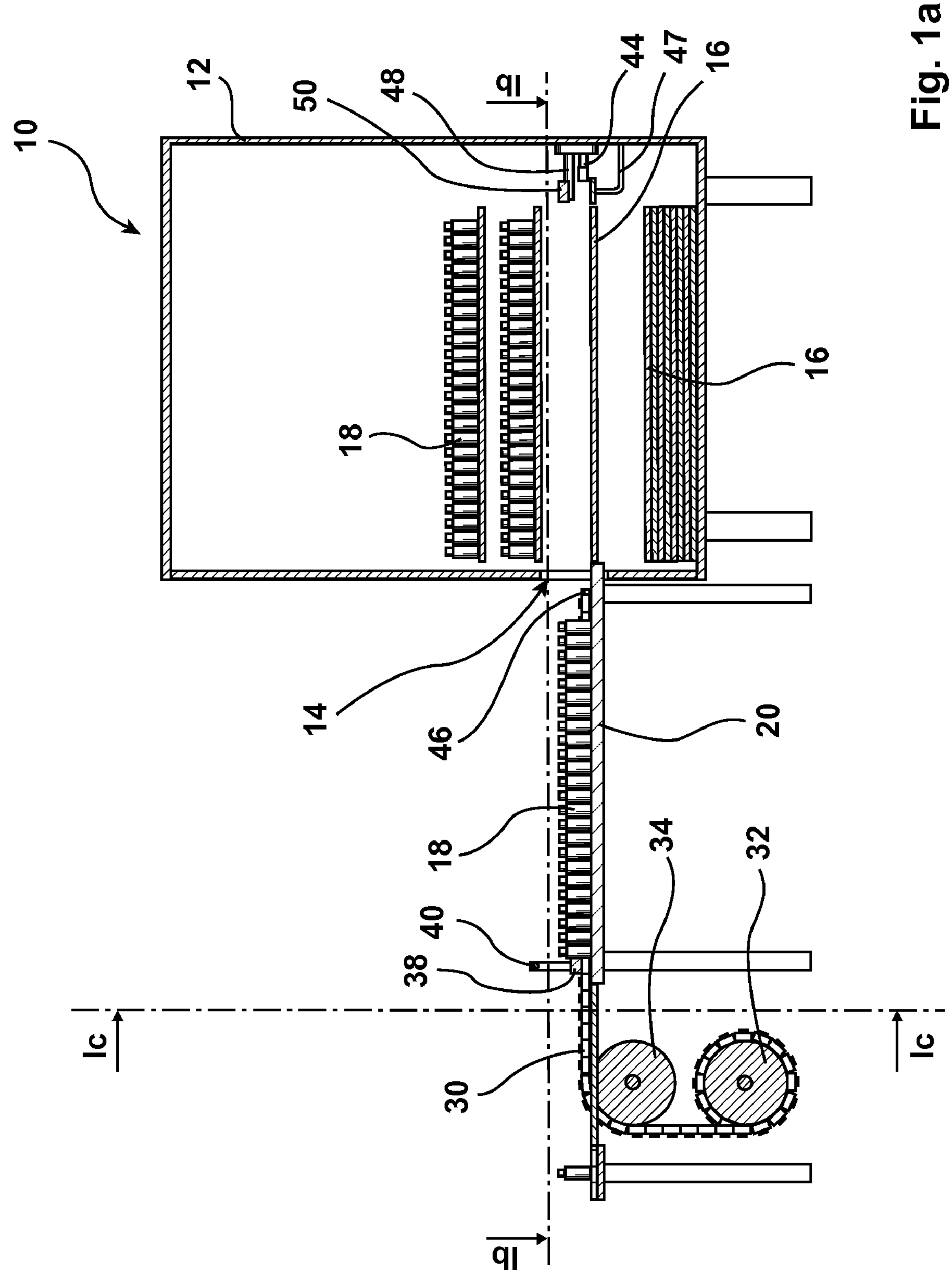
FIG. 1*a* shows in a schematic illustration a sectional side view of a first embodiment of an apparatus of the disclosure and of a freeze drying plant at a first time period, taken along line Ia-Ia in FIG. 1*b;*

The FIGS. 1*a* through 1*f* show, in a schematic illustration, an apparatus of the disclosure for loading and unloading a tray of a freeze drying plant and such a freeze drying plant 10. This freeze drying plant 10 includes a large chamber 12 that is provided on one side with an opening 14 for loading and unloading. This opening 14 can be closed with a door that has not been illustrated herein. Inside the chamber 12, there is provided a number of trays 16 that are adapted for vertical travel through a mechanism that has not been illustrated herein.

The apparatus for loading and unloading a tray and the freeze drying plant associated therewith illustrated in the drawing are illustrated merely schematically. Many details have been omitted in order to allow for increased clarity in illustrating the basic principle of the apparatus and of the freeze drying plant.

The product to be dried is usually filled into small bottles referred to as vials 18, said vials 18 being provided with a lid which is open before the freeze drying process, said lid being closed after the freeze drying process in order not to soil the freeze dried product. Such an apparatus for loading and unloading a tray of a freeze drying plant and the freeze drying plant itself are usually placed in clean rooms for the drugs contained in the vials not to be contaminated. This however also means that the entire loading and unloading process must be completely automated.

The apparatus for loading and unloading a tray 16 of a freeze drying plant 10 with a number of vials 18 includes a transfer table 20 on which the vials 18, which usually arrive one by one or in rows, are collected until a sufficient number of vials 18 is available on the transfer table 20. The transfer table 20 is thereby configured to be a planar, level surface and is limited on the right and on the left side by a respective guide element 22. In the embodiment shown, the guide element 22 is directly connected to the transfer table 20, the upper side of the guide element 22 being flush with the top side of the transfer table 20. In the guide element 22, an outer groove 24 is provided on the outer edge, said groove extending over the entire length of the guide element 22. Directly next to the outer groove 24 there is provided an inner groove 26, which is offset slightly inward parallel to the outer groove 24 and which also extends over the entire length of the guide element 22.

Figure 1B:
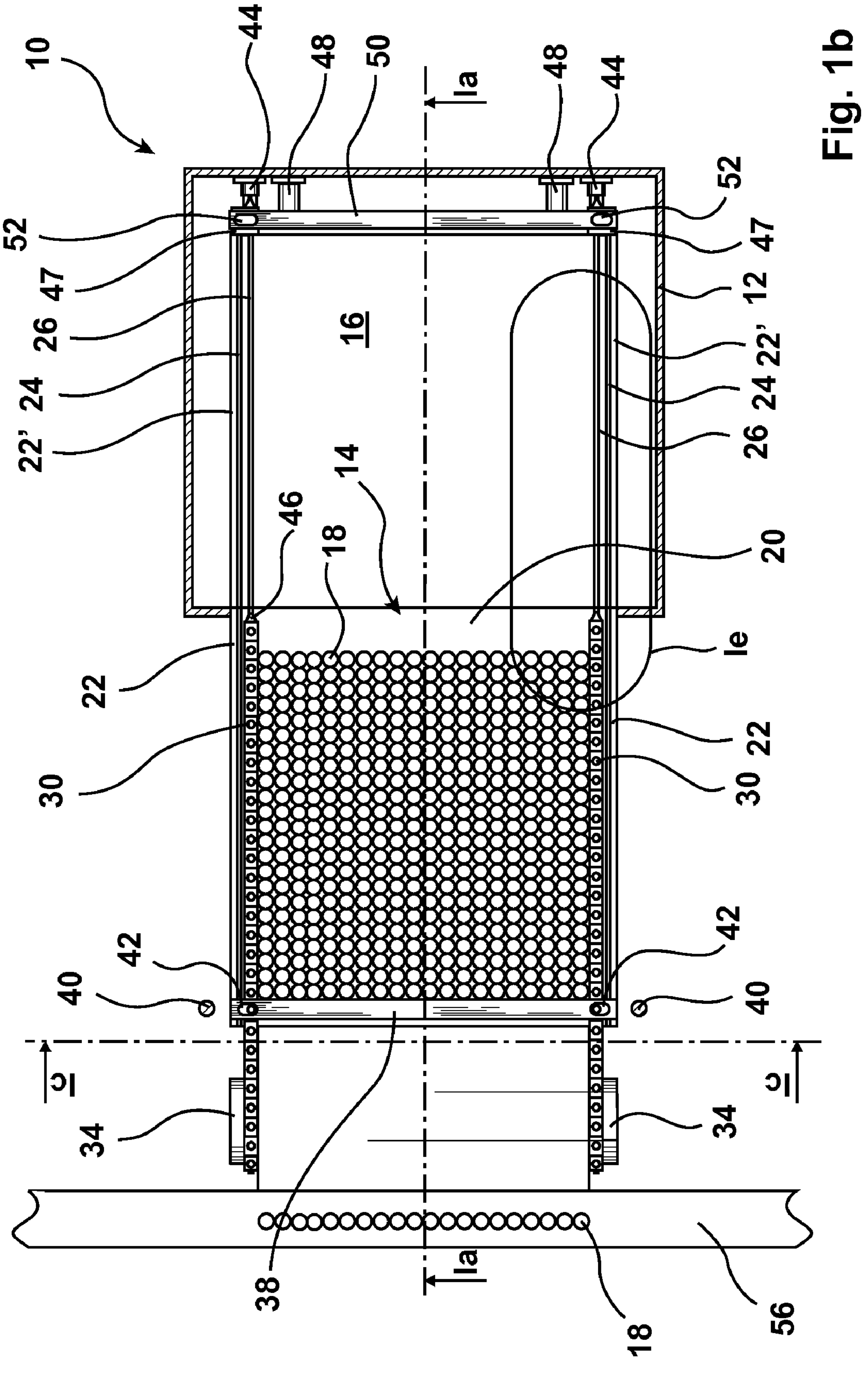
FIG. 1*b* is a sectional top view of the apparatus and the freeze dryer plant shown in FIG. 1*a*, taken along line Ib-Ib in FIG. 1*a;*

As can be inferred in particular from FIG. 1*b*, each of the trays 16 comprises on its right and left edge a corresponding guide element 22', each of them also respectively having an outer groove 24 and an inner groove 26. For loading the tray 16, said tray is caused to travel into the region of the opening 14 by means of the hoist mechanics that has not been illustrated herein so that the guide element 22 and the guide element 22' abut flush with each other. As a result, the outer groove 24 and the inner groove 26 of the guide element 22 directly merges into the outer groove 24 and the inner groove 26 of the guide element 22', as can be seen best from FIG. 1*d*.

Between the outer groove 24 and the inner groove 26 there are provided at certain intervals connecting grooves 28 which connect the outer groove 24 and the inner groove 26. The connecting grooves 28 are many times longer than the diameter of the guiding pin 36.

On each of the guide elements 22, which are arranged flush with the transfer table 20, there is disposed one transport carriage configured to be a pusher chain 30. This pusher chain 30 is stored on a cylinder 32 that causes it to move. The direction of rotation of the cylinder 32 determines the direction in which the pusher chain 30 moves. The cylinder 32 guides the pusher chain 30 about a deflection pulley 34 to the guide element 22 on the transfer table 20. The pusher chain 30 itself is composed of a number of individual links that are movable with respect to each other and which has certain stiffness while it pushes so that it can be utilized similar to a rod. At the underside of the pusher chain 30, there are disposed at regular intervals guiding pins 36, as can be seen best from FIG. 1*f*. At the time period shown in the FIGS. 1*a* through 1*f*, the guiding pins 32 of the pusher chain 30 engage the inner groove 26 of the guide element 22, thus reliably guiding the pusher chain 30 on the edge of the transfer table 20 or of the tray 16. It is understood that the guiding pins 36 are adapted to the size of the inner groove 26 or of the outer groove 24. As explained in closer detail herein after, the pusher chain 30 with its guiding pins 36 can also be guided in the outer groove 24.

In addition to the right and left pusher chain 30, the pusher device also has a loading element configured to be a loading pusher 38 that can be stowed in a shelf 40 located above the transfer table 20 when not needed. In this case, the loading pusher 38 is placed so far at the top on the shelf 40 for the vials 18 to be capable of passing underneath the loading pusher 38. The shelf 40 is provided with a corresponding automated mechanics and can place the loading pusher 38 onto the right and the left pusher chain 30 from where it can be retrieved in due time. On the right and on the left side of the loading pusher 38, long holes 42 engage into corresponding pins 54 on one of the links of the pusher chain 30 for the loading pusher 38 to be thus reliably retained on the right and left pusher chain 30. If now the right and the left pusher chain 30 are moved towards the tray 16, the loading pusher 38 is entrained, thereby pushing the vials 18 located on the transfer table 20 in front of it until they arrive on the tray 16.

Figure 1C:
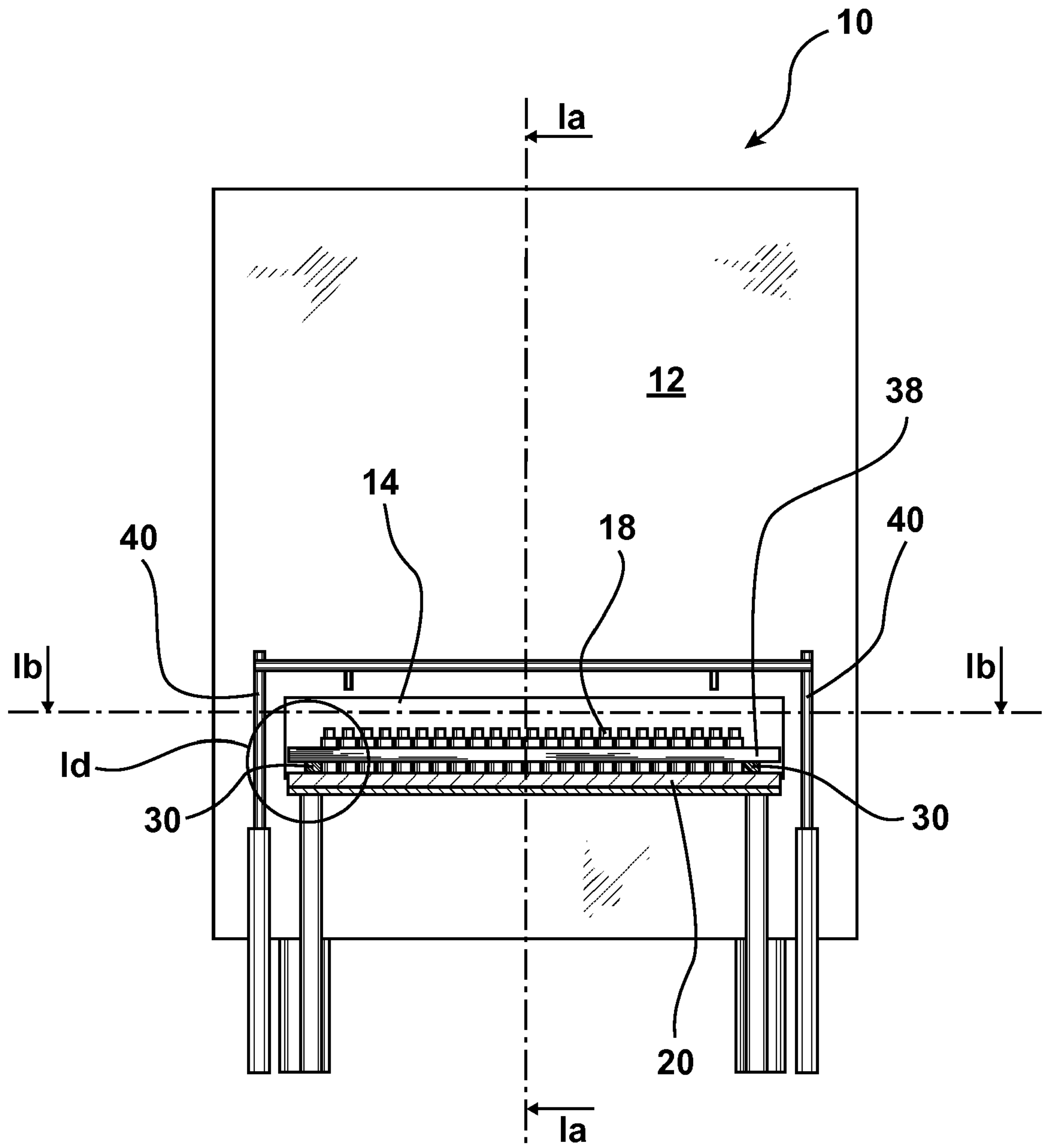
FIG. 1*c* is a sectional front view of the apparatus. and the freeze drying plant as shown in FIG. 1*a*, taken along line Ic-Ic in FIG. 1*a;*
Figure 1D:
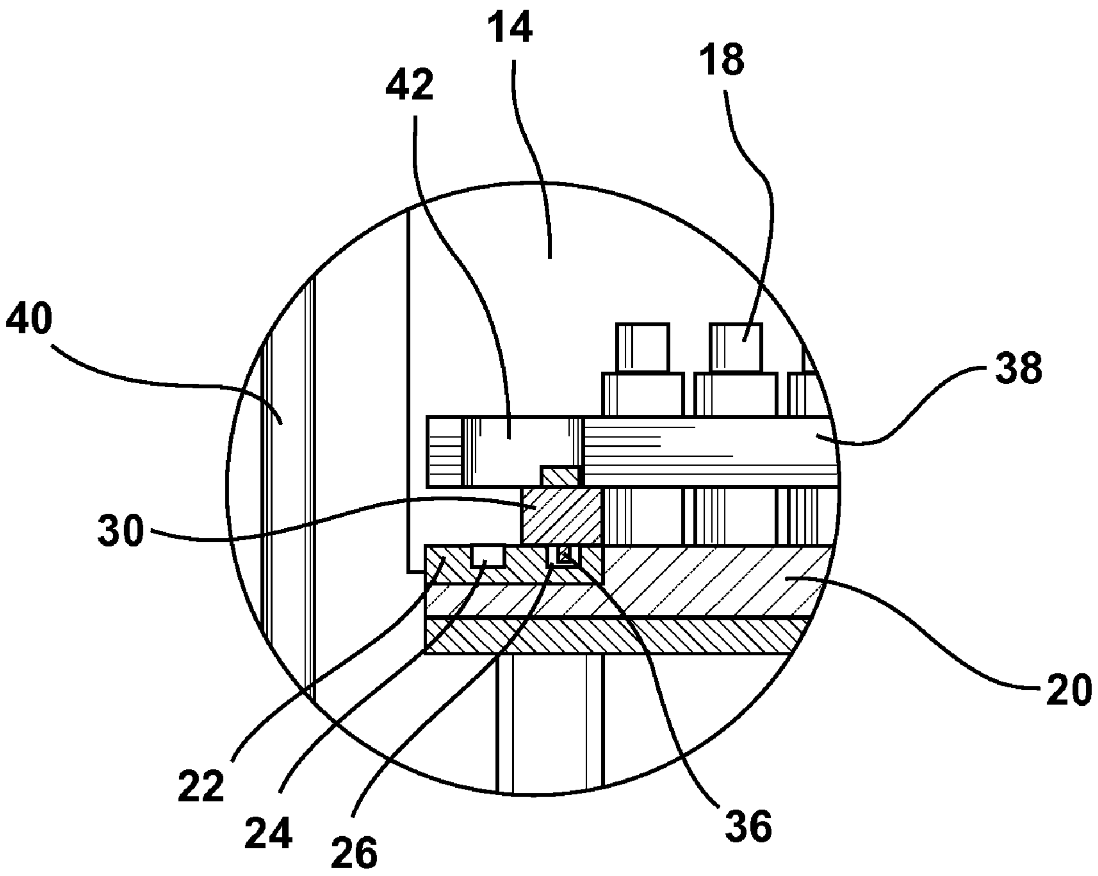
FIG. 1*d* is an enlarged detail of the apparatus of the disclosure, taken along line Id in FIG. 1*c;*
Figure 1E:
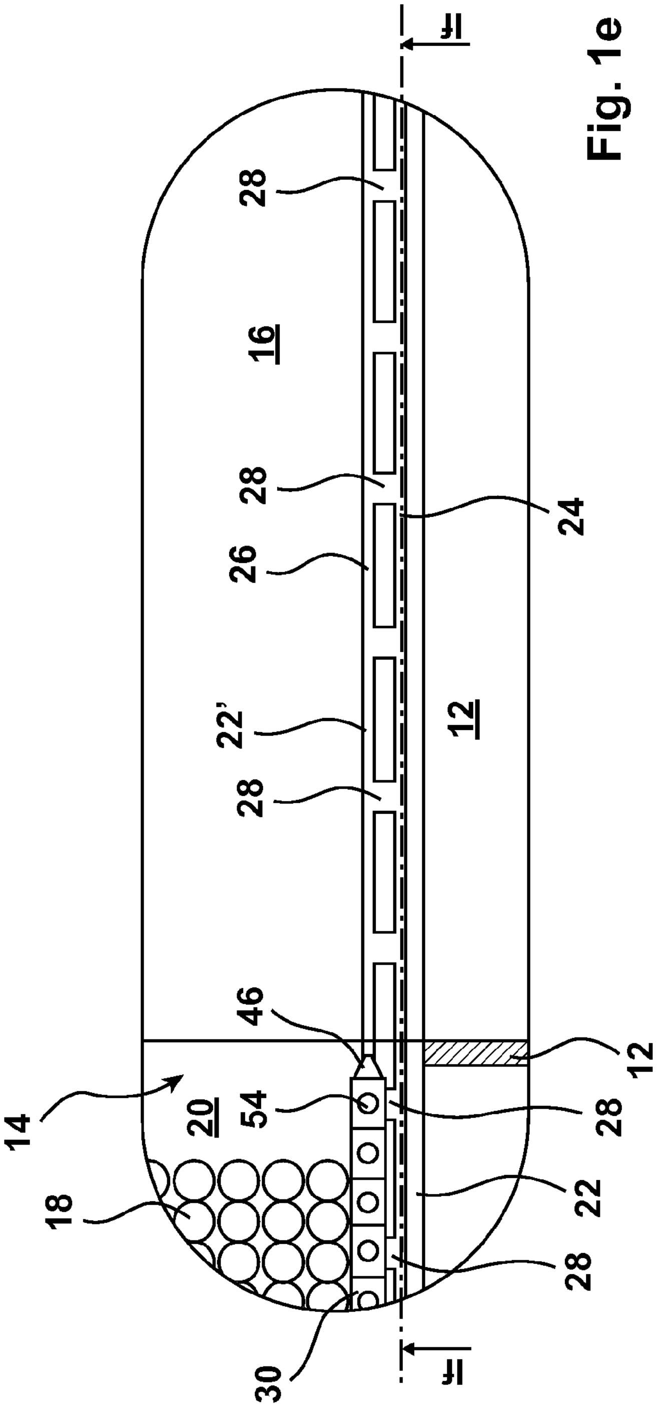
FIG. 1*e* is an enlarged detail of the apparatus of the disclosure, taken along line Ie in FIG. 1*b;*
Figure 1F:
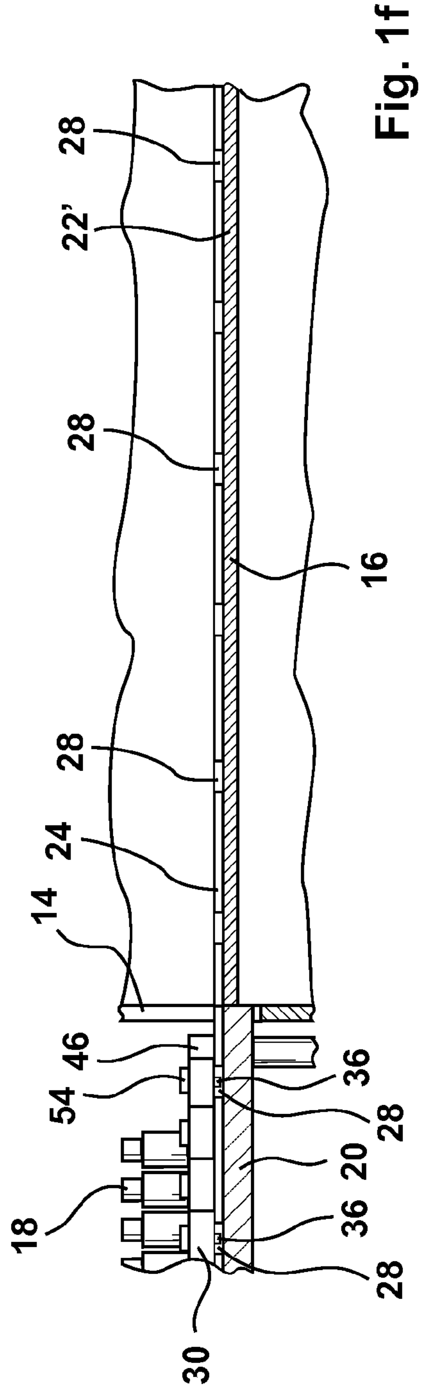
FIG. 1*f* is a sectional side view of the enlarged detail as shown in FIG. 1*e*, taken along line If-If in FIG. 1*e;*

As can be seen in particular from the FIGS. 1*b* and 1*c*, the right and the left pusher chain 30 is disposed on the transfer table 20, meaning on the guide element 22 for the pusher chains 30 forming a lateral limitation of the transfer table 20. The vials 18 are placed so close on the transfer table 20 that the vials 18 placed on the border can hit the corresponding pusher chain 30. This applies in an analogous fashion for the tray 16.

The apparatus for loading and unloading a tray also has two centering apparatus 44 that are mounted to a wall of the chamber 12 of the freeze drying plant 10 that is opposite the opening 14. Each of these centering apparatus 44 are positioned so as to be capable of receiving a head 46 of the pusher chain 30 as soon as said chain has passed the rear edge of the tray 16. The centering apparatus 44 is displaceable horizontally in order to transfer the pusher chain 30 from the inner groove 26 into the outer groove 24 and vice versa. Details thereof will be described in detail herein after with respect to the loading method.

In order to prevent the head 46 of the pusher chain 30 from falling down when said head 46 projects beyond the rear edge of the tray 16, a supporting table 47 is provided there. As a result, the head 46 always finds the way into the centering apparatus 44.

The apparatus for loading and unloading a tray 16 of a freeze drying plant 10 also possesses a retaining mechanism 48 for receiving an unloading pusher 50. Just like the centering apparatus 44, the retaining mechanism 48 is also mounted to the wall of the chamber 12 of the freeze drying plant 10 that is opposite the opening 14. It is understood that both the centering apparatus 44 and the retaining mechanism 48 are mounted to the chamber 12 together with the unloading pusher 50 so as not to hinder the vertical motion of the trays 16. The retaining mechanism 48 carries the unloading pusher 50 if it is not needed for unloading the trays 16. On the other side, the retaining mechanism 48 is capable of settling the unloading pusher 50 onto the pusher chains 30 deployed as far as behind the rear edge of the tray 16 in such a manner that long holes 52 of the unloading pusher 50 located on the right and left edge engage into mating pins 54 provided on the pusher chain 30 for the right and the left pusher chain 30 to be capable of entraining the unloading pusher 50.

The method for loading and unloading the tray 16 of the freeze drying plant 20 with a number of vials 18 will be described in detail herein after.

To load a tray 16 of the freeze drying plant 10, the uppermost tray 16 of the stack located on the bottom of the chamber 20 is moved upward with a mechanics that has not been illustrated herein so that the tray 16 is flush with the transfer table 20. It is understood that the door of the freeze drying plant 10 has been opened before. A supplying device 56, which has been merely outlined herein, supplies the vials 18, which are collected on the transfer table 20. These vials 18 are thereby placed in rows, one row of vials 18 extending from a right pusher chain 30 to a left pusher chain 30. The spacings are thereby dimensioned for the desired number of vials 18 to register between the pusher chains 30. The pusher chains 30 are thereby deployed so far that their front head lies in front of the first row of vials 18 on the transfer table 20. As soon as all the vials 18 have been gathered on the transfer table, the shelf 40 lowers the loading pusher 38 from its raised position onto the right and onto the left pusher chain 30, the long holes 42 of the loading pusher 38 receiving a pin 54 mounted on the top side of the pusher chain 30.

Next, the cylinder 32 is put into operation and drives the right and the left pusher chain 30 together with the loading pusher 38 forward for the vials 18 to be pushed from the transfer table 20 to the tray 16. The vials 18, the right and the left pusher chain 30 and the loading pusher 38 are forced to move at the same speed so that no friction occurs between the vials 18 disposed on the border and the pusher chains 30. As a result, no friction occurs between the vials 18 and the pusher chain while the tray 16 is being loaded so that no vial 18 can tip over. Another advantage is that through this orderly displacement of the vials 18 the sequence and order of the vials 18 on the transfer table 20 is maintained.

Figure 2A:
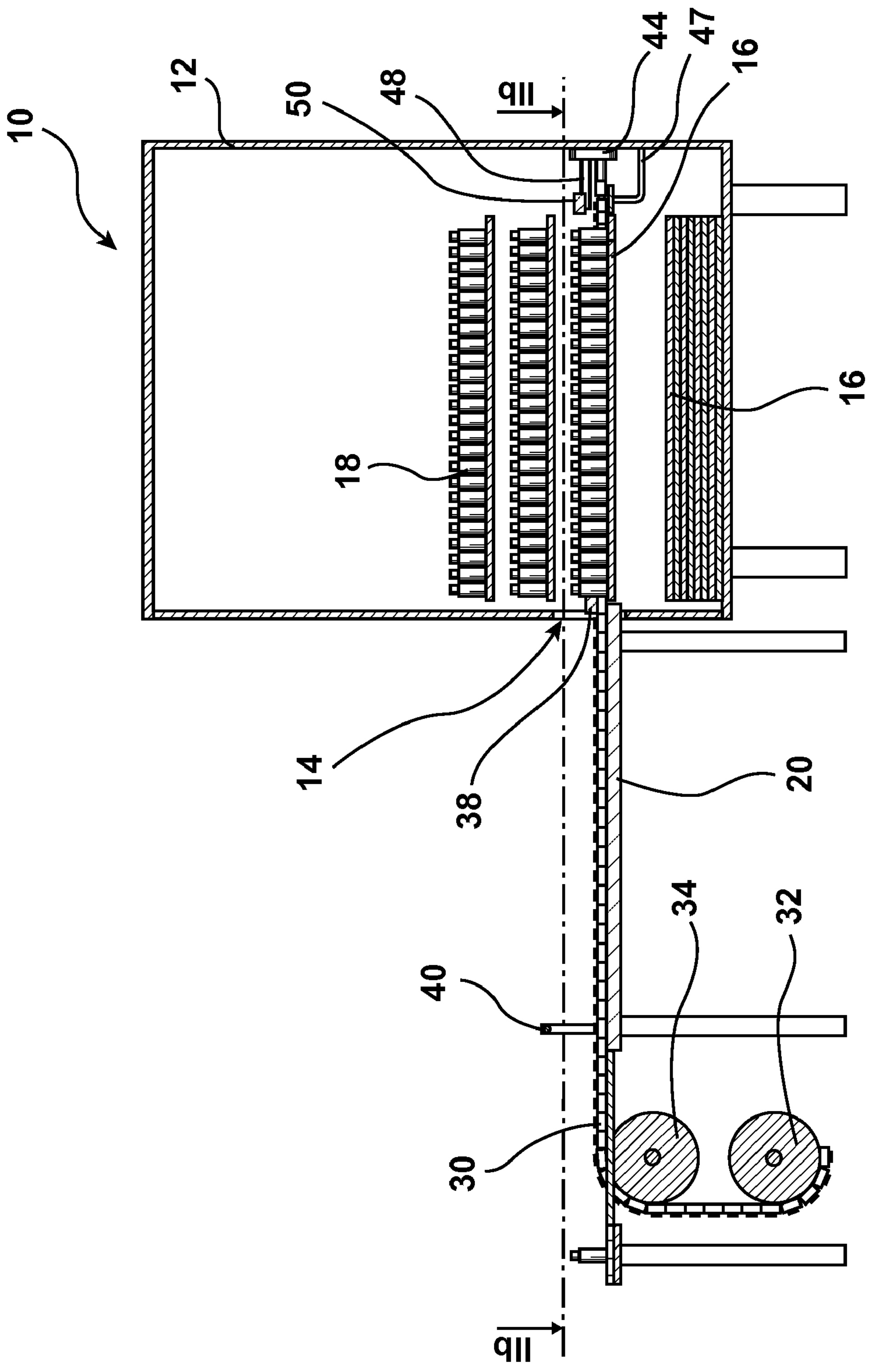
FIG. 2*a* is a sectional side view of the apparatus and of the freeze drying plant as shown in FIG. 1*a*, at a second time period, taken along line IIa-IIa in FIG. 2*b;*
Figure 2B:
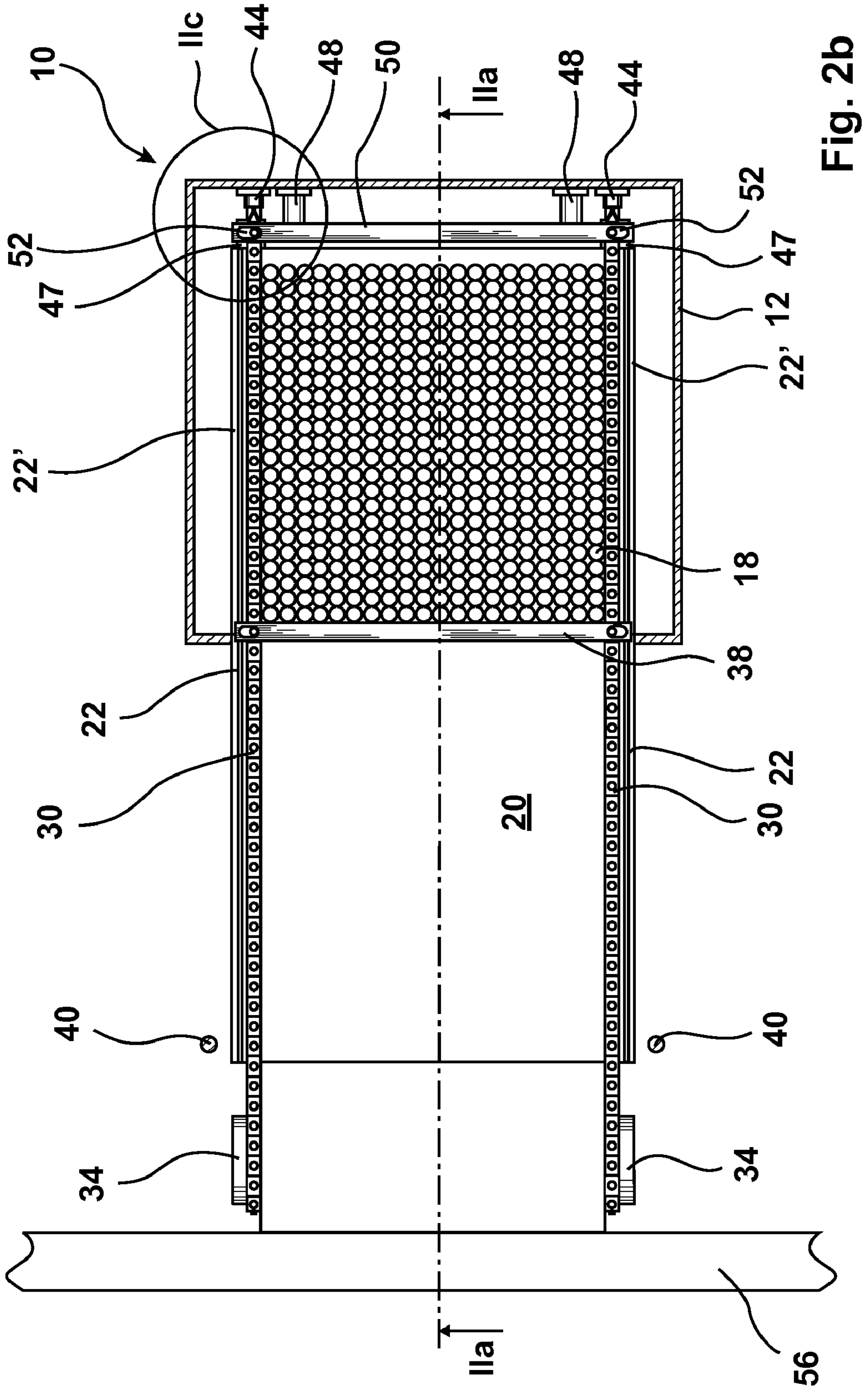
FIG. 2*b* is a sectional top view of the apparatus and of the freeze drying plant as shown in FIG. 2*a*, taken along line IIb-IIb in FIG. 2*a;*

In the FIGS. 1*a* through 1*f*, the apparatus of the disclosure and the freeze drying plant 10 is illustrated at a first time period, shortly before the vials 18 are displaced from the transfer table 20 onto the trays. In the FIGS. 2*a* through 2*c*, there is illustrated a second time period at which the vials 18 have completely arrived on the tray 16 and at which the pusher chains 30 are in their completely extended end position.

Figure 2C:
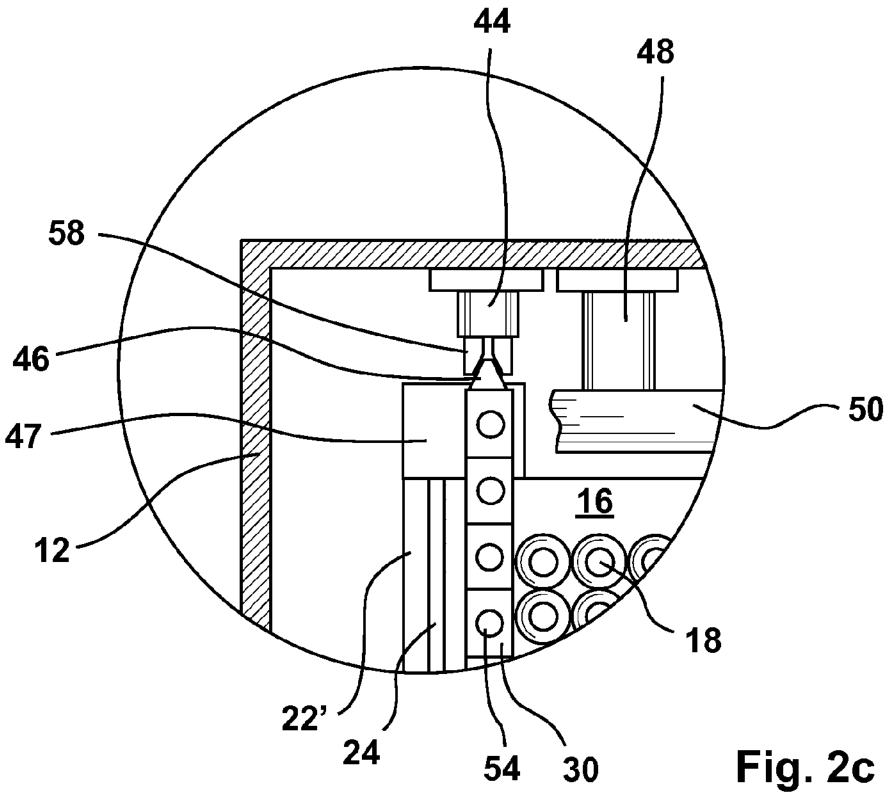
FIG. 2*c* is an enlarged detail of the apparatus of the disclosure, taken along line IIc in FIG. 2*b;*

As can be seen in FIG. 2*c* in particular, the head 46 of the pusher chain 30 is taken hold of by the centering apparatus 44 as soon as the pusher chain 30 has reached its end position, the head 46 resting on the supporting table 47. The centering apparatus 44 thereby also fixes the head 46 of the pusher chain 30 and pushes the head 46, and as a result thereof at least one part of the pusher chain 30, from the inner groove 26 onto the outer groove 24. At the same time, the deflection pulley 34 at the other end of the pusher chain 30 is also offset outward for this part of the pusher chain 30 to be also transferred from the inner groove 26 onto the outer groove 24. Now, large portions of the pusher chain 30 are in the outer groove 24, whilst in the center area of the pusher chain 30 parts may still lie on the inner groove 26 or in the connecting webs 28. As soon however as the pusher chain drive pulls the pusher chain 30 tight, all of the remaining parts of the pusher chain 30 are pulled into the outer groove 24.

Figure 3A:
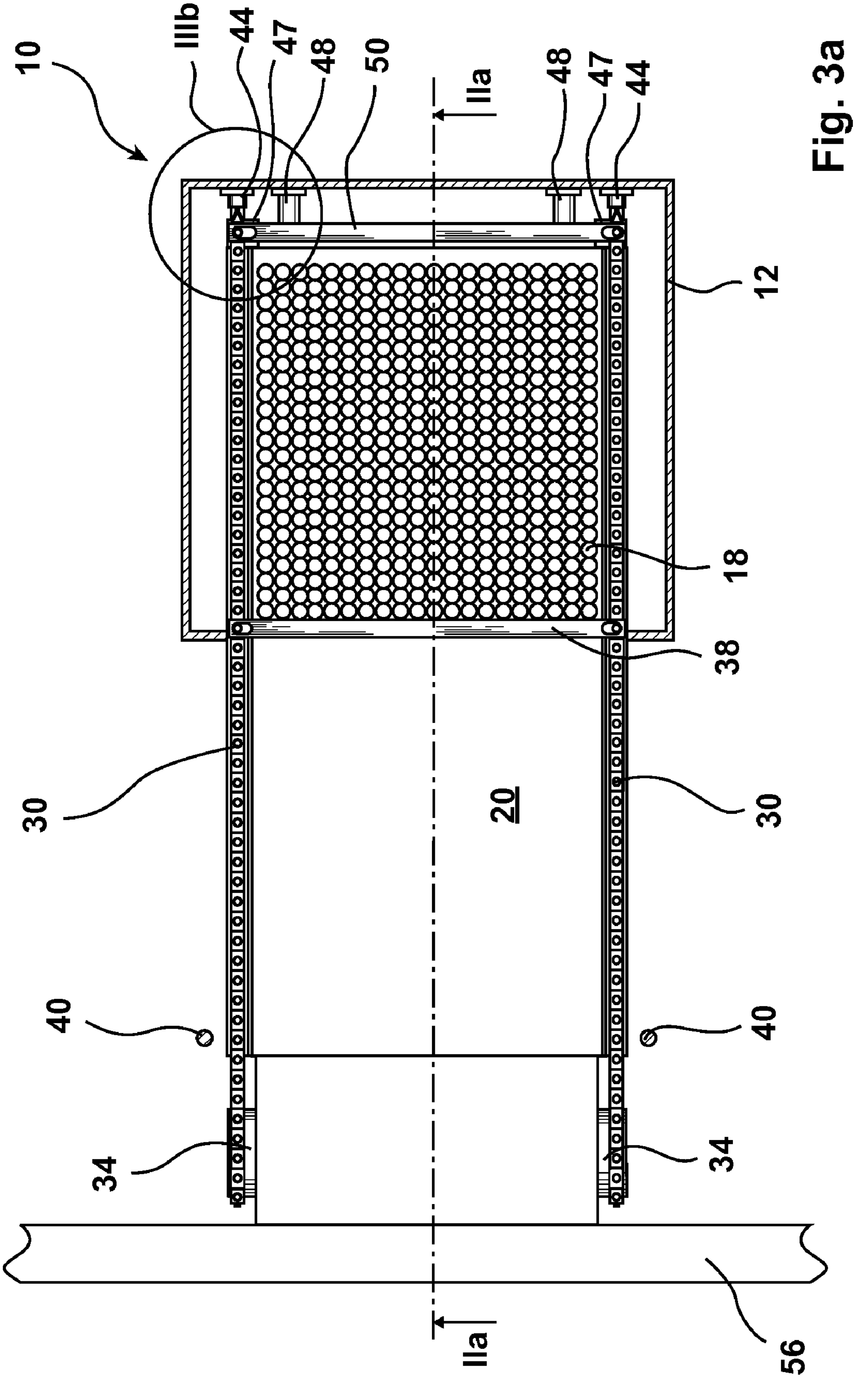
FIG. 3*a* is a sectional top view of the apparatus and of the freeze drying plant as shown in FIG. 1*a*, at a third time period.
Figure 3B:
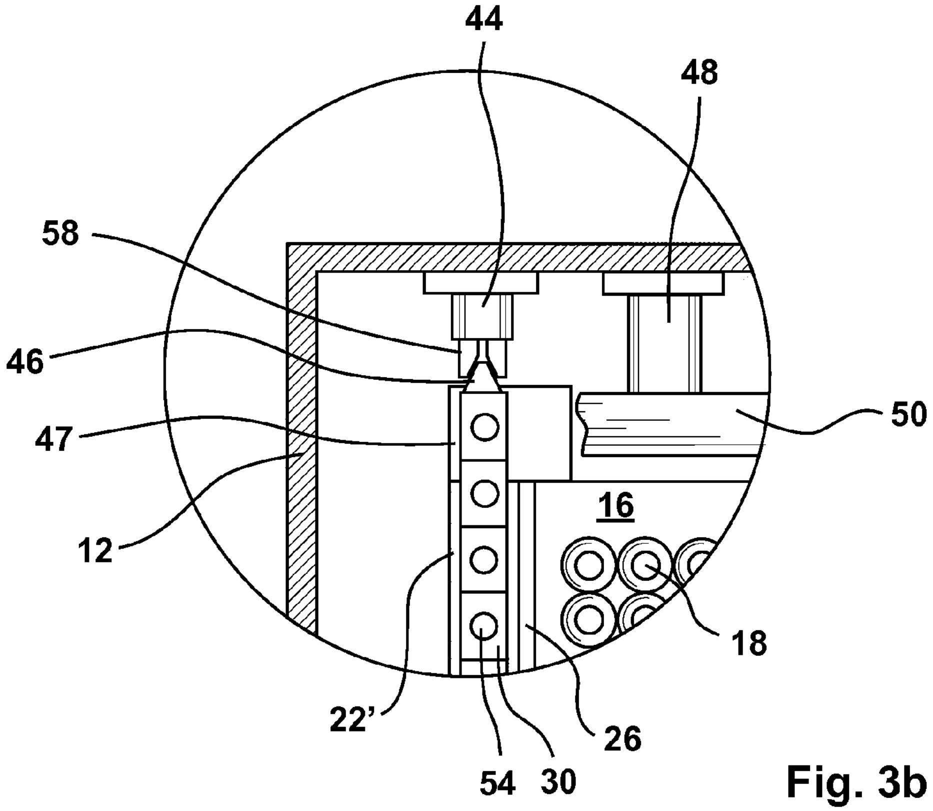
FIG. 3*b* is an enlarged detail of the apparatus of the disclosure taken along line IIIb in FIG. 3*a;*

As can be seen from FIG. 3*b* in particular, the pusher chain 30 is now guided in the outer groove 24 and is spaced a significant distance from the vials 18. In the FIGS. 3*a* and 3*b*, this third time period is shown.

Figure 4:
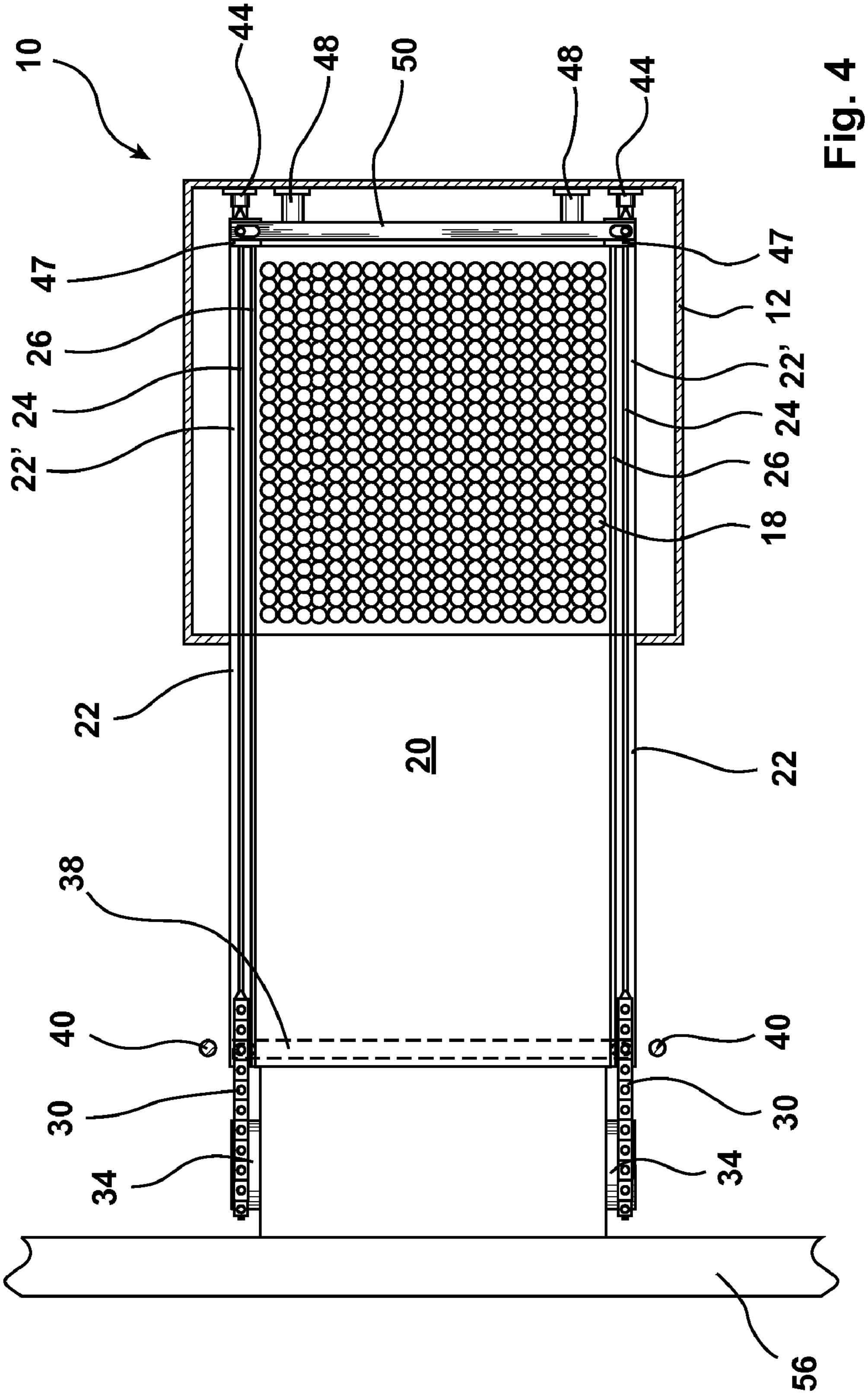
FIG. 4 is a sectional top view of the apparatus and of the freeze drying plant as shown in FIG. 1*a*, at a fourth time period.

Then, the two pusher chains 30 are pulled out of the freeze drying plant 10 together with the loading pusher 38, said pusher chain 30 winding onto the cylinder 32 as is best seen from FIG. 4. Arrived at the shelf 40, the loading pusher 38 is taken hold of by the shelf 40 and raised.

Figure 5:
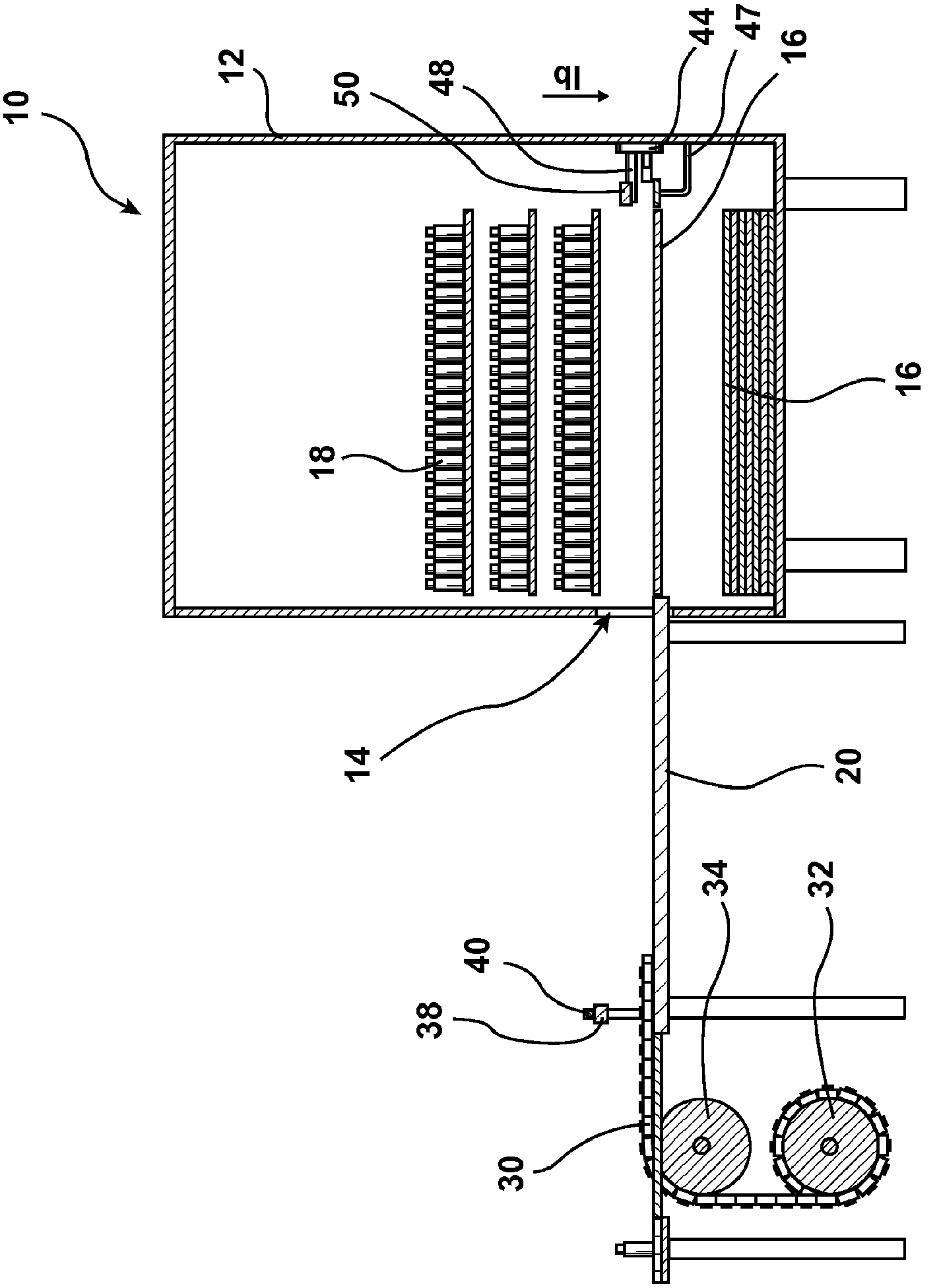
FIG. 5 is a sectional side view of the apparatus and of the freeze drying plant as shown in FIG. 1*a*, at a fifth time period.

As soon as the pusher chain 30 is wound as far as possible on the cylinder 32, the deflection pulleys 34, which are not shown in closer detail in FIG. 4, are moved inward for the pusher chain 30 to be transferred from the outer groove 24 into the inner groove 26. It is understood that, upon transfer of the pusher chain 30 from the outer groove 24 into the inner groove 26, the guiding pins 36 disposed underneath the pusher chain 30 are guided via the connecting grooves 28, as this is best illustrated in the FIGS. 1*e* and 1*f*. Associated therewith, the fully loaded tray 16 is moved further upward inside the chamber 12 together with the trays 16 loaded before and the next tray 16 is taken from the stack and brought to the transfer table 20, as it is shown in FIG. 5 at a fifth time period. Now, the loading process can begin again.

As soon as all the trays 16 are loaded, the transfer table 20 is removed from the freeze drying plant 10 and the door of the freeze drying plant, which has not been illustrated herein, is closed for the actual freeze drying process to take place.

Figure 6:
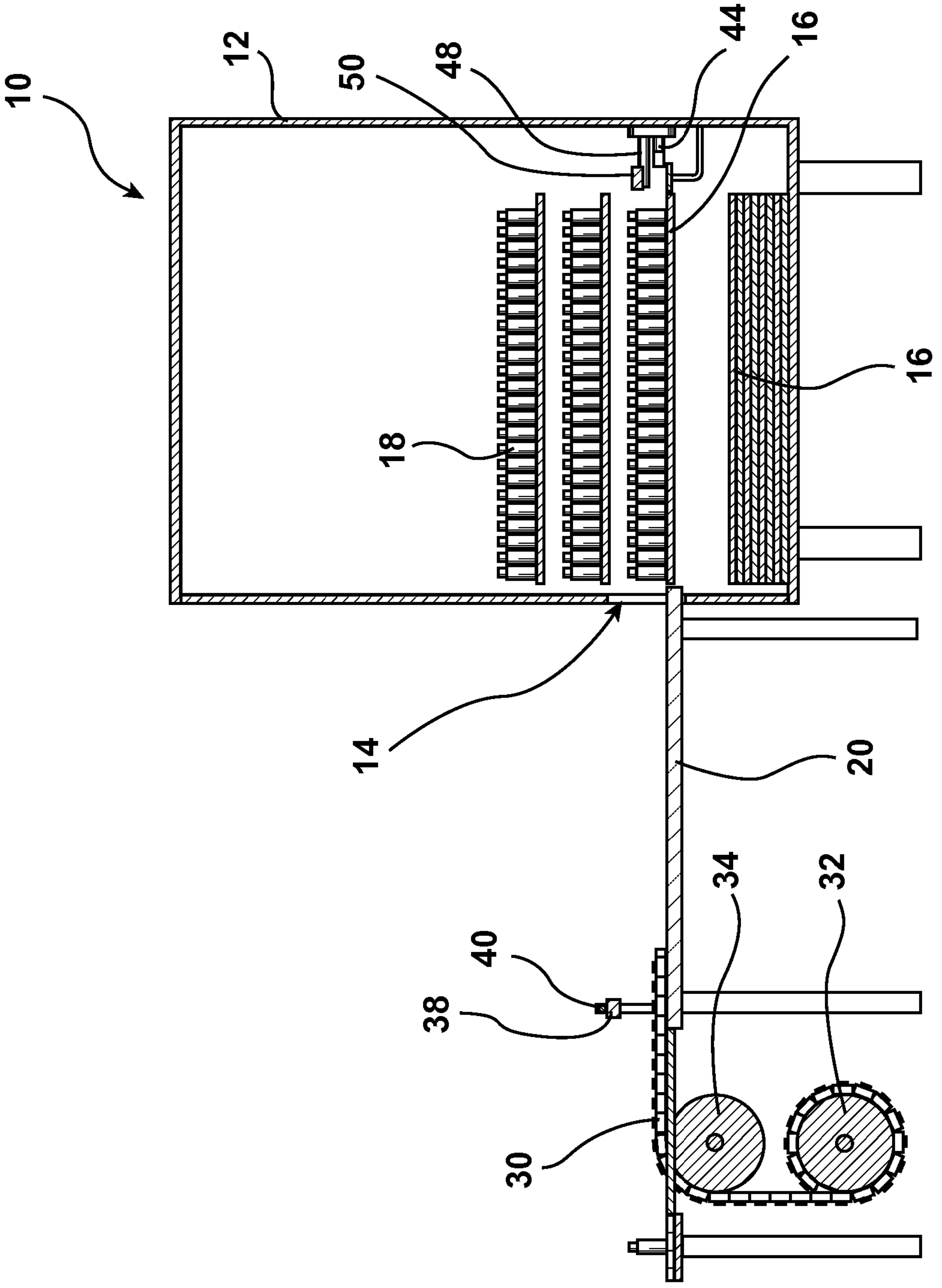
FIG. 6 is a sectional side view of the apparatus and of the freeze drying plant as shown in FIG. 1*a*, at a sixth time period.
Figure 7:
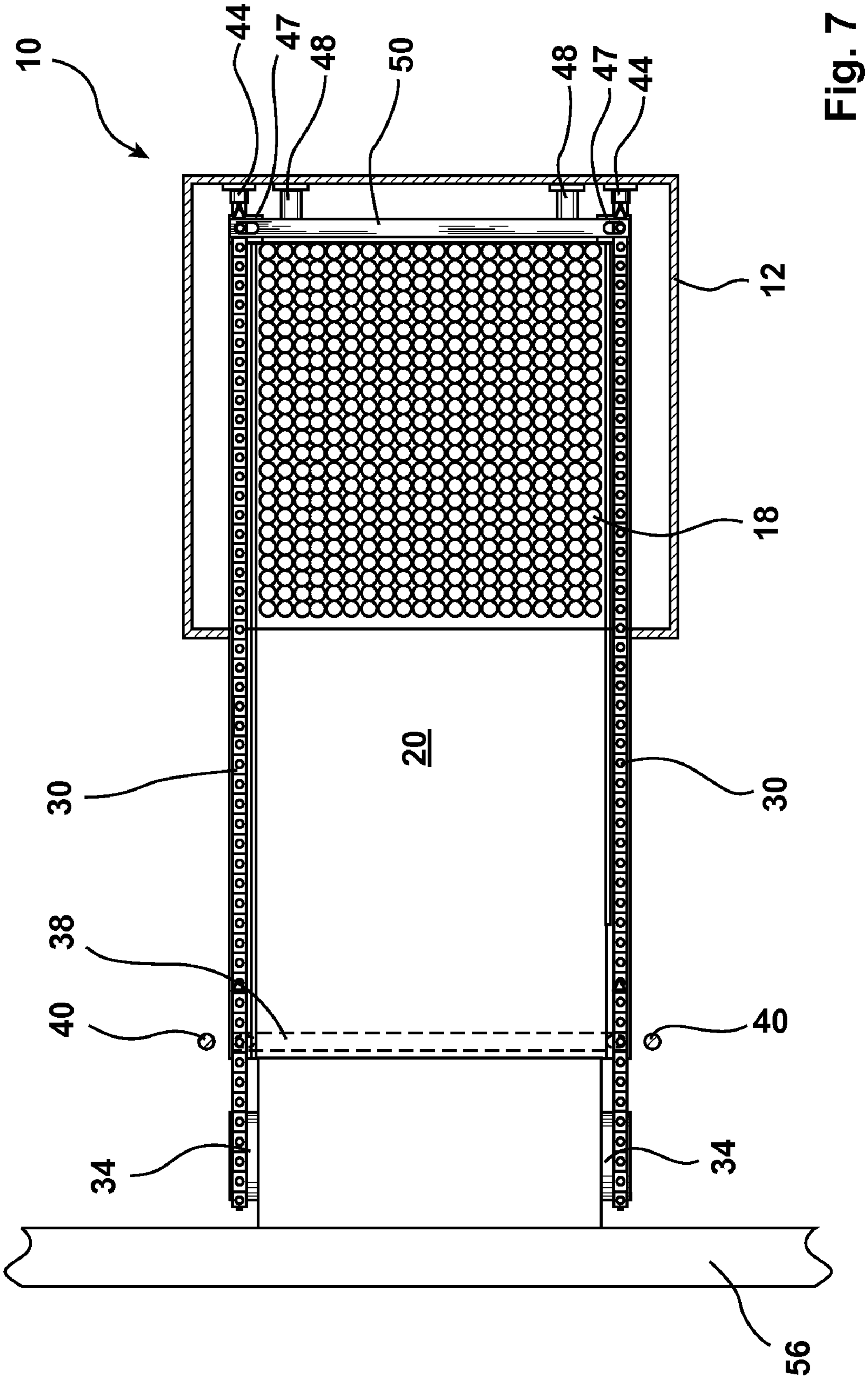
FIG. 7 is a sectional side view of the apparatus and of the freeze drying plant as shown in FIG. 1*a*, at a seventh time period.

Upon completion of the freeze drying process, the trays 16 are caused to travel vertically downward simultaneously or consecutively for the tray to abut the vials located underneath, thus pushing the lid located in the vials downward and closing them. Next, the trays 16 are again spaced slightly apart so as to allow for unloading the trays. Now, the door of the freeze drying plant 10 is opened again and the transfer table 20 is moved to the opening 14 in order to unload the first tray 16. At the sixth time period shown in FIG. 6, some trays 16 have already been unloaded and stacked on the bottom of the chamber 12. Another tray 16 is moved flush with the transfer table 20 and ready for unloading. For this purpose, the two pusher chains 30 are now moved into the freeze drying chamber 12 in the respective outer groove 24 on the guide elements 22 and 22' without the loading pusher 30 until the head 46 of the pusher chain 30 reaches the centering apparatus 44 for the tongs 58 to fix the head 46 of the pusher chain 30, as this is shown in FIG. 7 at the seventh time period.

Figure 8A:
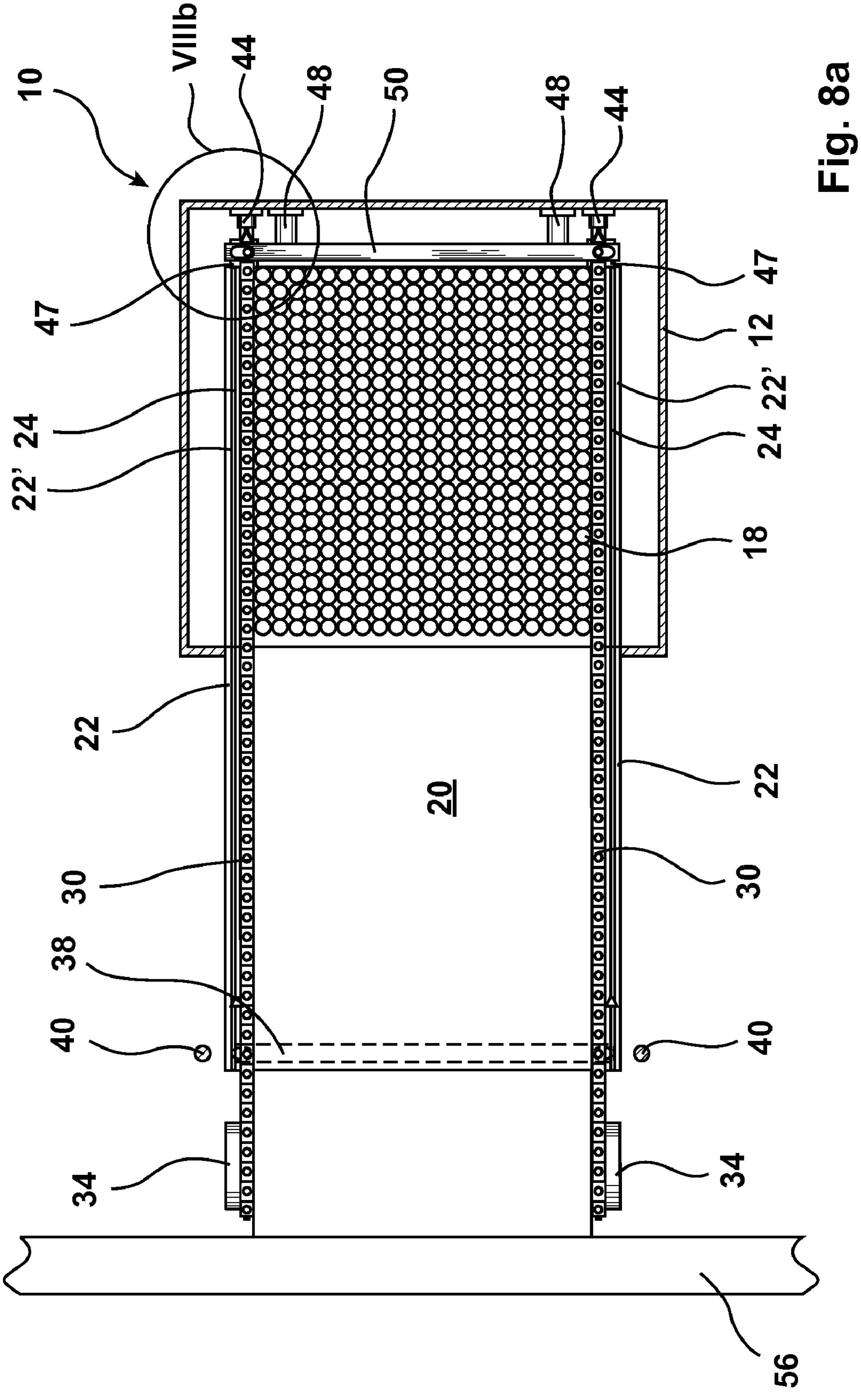
FIG. 8*a* is a sectional side view of the apparatus and of the freeze drying plant as shown in FIG. 1*a*, at an eighth time period.
Figure 8B:
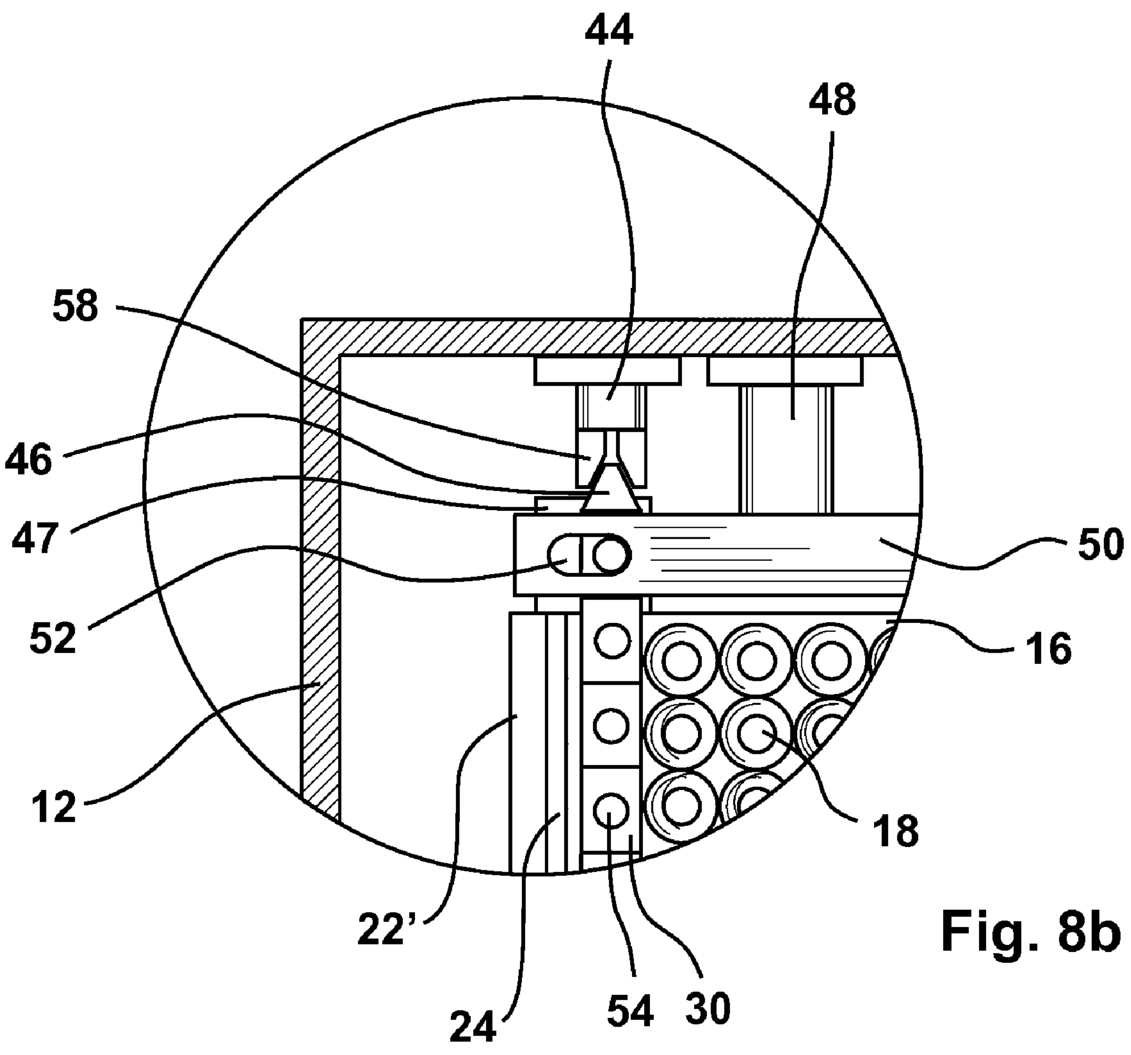
FIG. 8*b* is an enlarged detail view of the apparatus of the disclosure taken along line VIIIb in FIG. 8*a;*

Next, the deflection pulley 34 and the centering apparatus 44 are caused to move in the opposite direction for the pusher chains 30 to be displaced from the outer groove 24 into the inner groove 26 as shown in the FIGS. 8*a* and 8*b* at the eighth time period.

Figure 9:
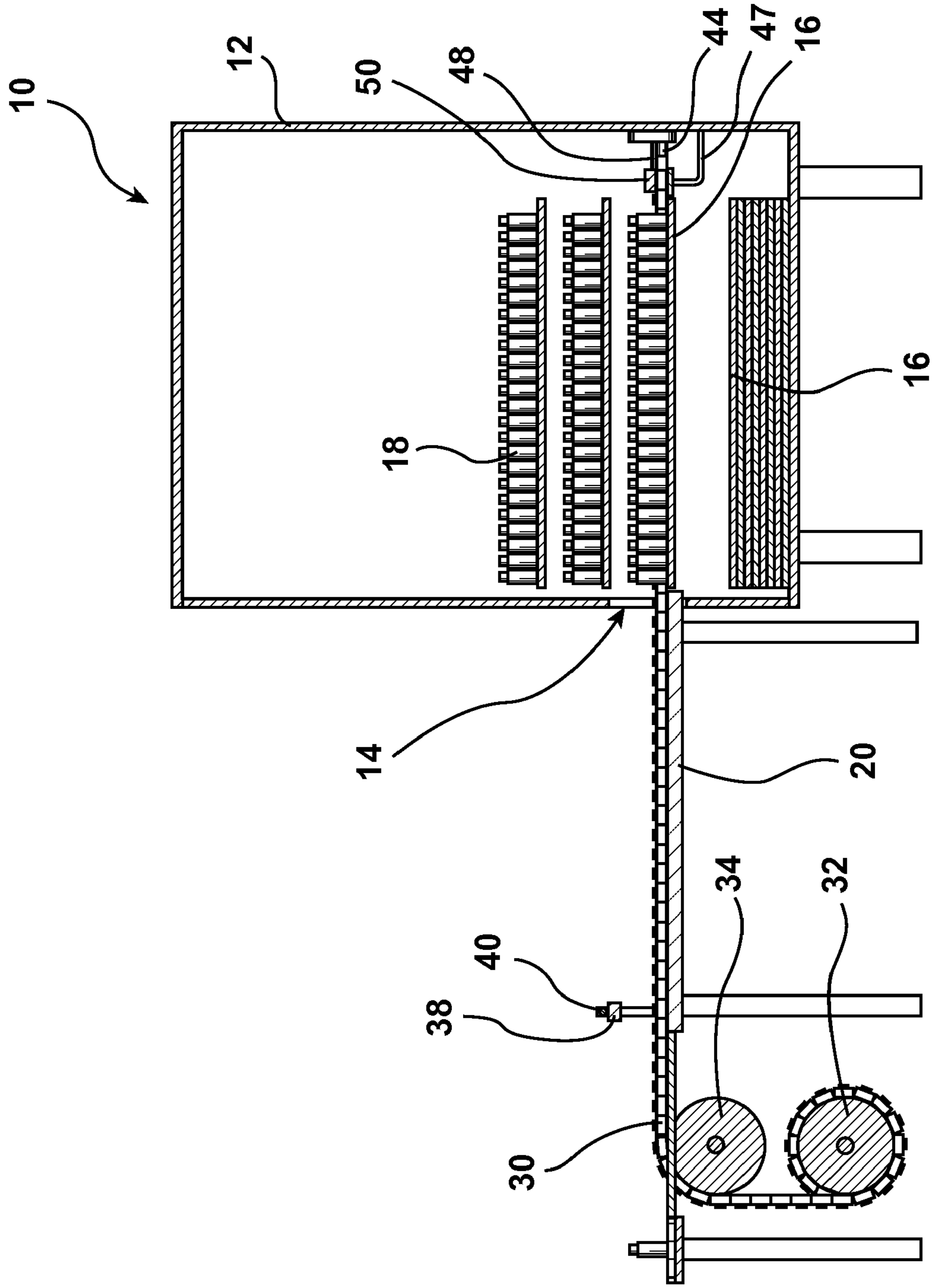
FIG. 9 is a sectional side view of the apparatus and of the freeze drying plant as shown in FIG. 1*a*, at a ninth time period.

Next, the retaining mechanics 48 places the unloading pusher onto a foremost link of the pusher chain 30 for the pin 54 to engage the long hole 52 of the unloading pusher 50, thus retaining it. This ninth time period is shown in FIG. 9.

Figure 10:
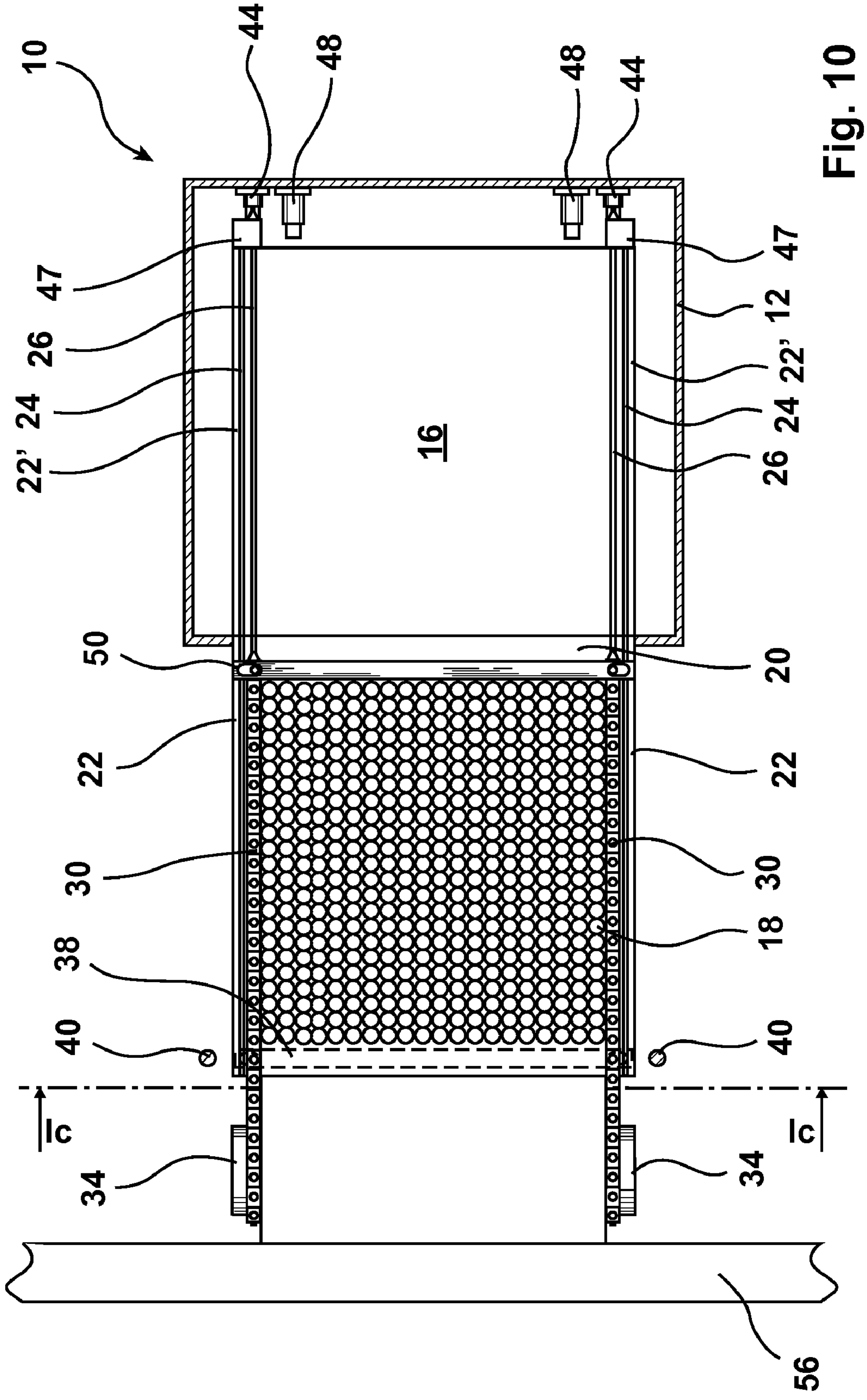
FIG. 10 is a sectional side view of the apparatus and of the freeze drying plant as shown in FIG. 1*a*, at a tenth time period.

Next, the cylinder 32 pulls the pusher chains 30 together with the unloading pusher 50 out of the chamber 12, the pusher chains 30 winding again on the cylinder 32. As soon as all the vials 18 have arrived on the transfer table 20, as is shown in FIG. 10 at the tenth time period, the vials 18 are evacuated for further processing through an evacuation device 56 that has not been illustrated herein. Since no relative movement takes place between the vials 18 and the pusher chain 30 when the vials 18 are being removed from the freeze drying plant 10, the vials 18 keep their positions relative to the other vials 18. As a result, it is possible to conclude the quality of the freeze drying process via a quality control of the products contained in the vials. Also, through this known position of the discrete vials 18, it is possible to remove from the plant at a later stage those vials 18 that were located on critical points on the tray 16. As a result, the quality control of the freeze drying process is facilitated since only the known, critical vials 18 need to be subjected to quality control in order to allow for detecting the quality of the freeze drying process.

Figure 11:
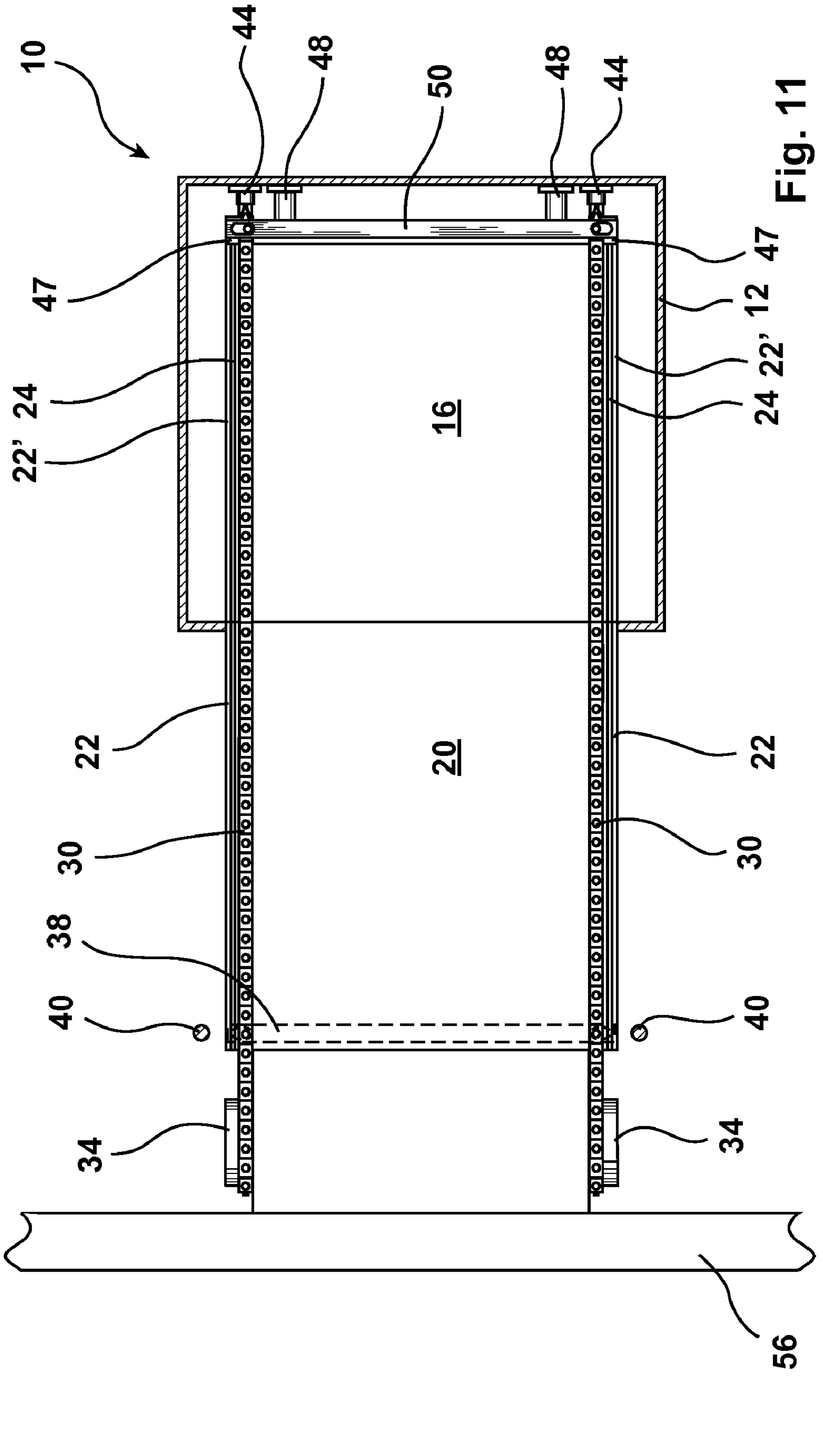
FIG. 11 is a sectional side view of the apparatus and of the freeze drying plant as shown in FIG. 1*a*, at a eleventh time period.

Once all the vials have been evacuated, the pusher chains 30 are again moved together with the unloading pusher 50 as far as the rear wall of the chamber 12 for the retaining mechanism 48 to be capable of receiving again the unloading pusher 50 as this can be seen at the eleventh time period shown in FIG. 11. Next, the centering apparatus 44 again take hold of the heads 46 of the pusher chains 30 and transfer pusher chains 30 in the way described before from the inner groove 26 into the outer groove 24 before the pusher chains 30 are again pulled out of the freeze drying plant by the cylinder 32. Now, the tray 16, which has been emptied in the meantime, is placed onto the stack on the bottom of the chamber 12 and the next tray 16 is moved to the transfer table 20 to be emptied before the next tray 16 is emptied in the way described. This process is repeated until all of the trays 16 are empty.

The advantage of mounting the unloading pusher 50 to the rear wall of the chamber 12 is that the unloading pusher needs not be passed over the freshly closed vials 18 in order to remove the vials 18 from the tray 16. As a result, the vertical spacing between neighbouring trays 16 can be reduced so that, although the chamber keeps the same size, additional trays can be integrated, this in turn increasing the economic efficiency of the freeze drying plant.

Another advantage is that the vials, which sometimes adhere to the upper tray, can no longer be detached by the incoming unloading pusher and overturn. With the unloading pusher disposed behind the trays, one achieves that the vials adhering to the upper trays are only detached if the entire field of the vials is moved toward the output. In this case, the vial falling down from the top is guided by the neighbouring vials so that this vial cannot fall down. This is also promoted by the fact that the free space between the upper edge of the vials and the underside of the next tray is smaller. In other words, the vial cannot fall so low when it detaches from the upper tray so that the probability for the vial to tilt over is reduced to a minimum.

Figure 12A:
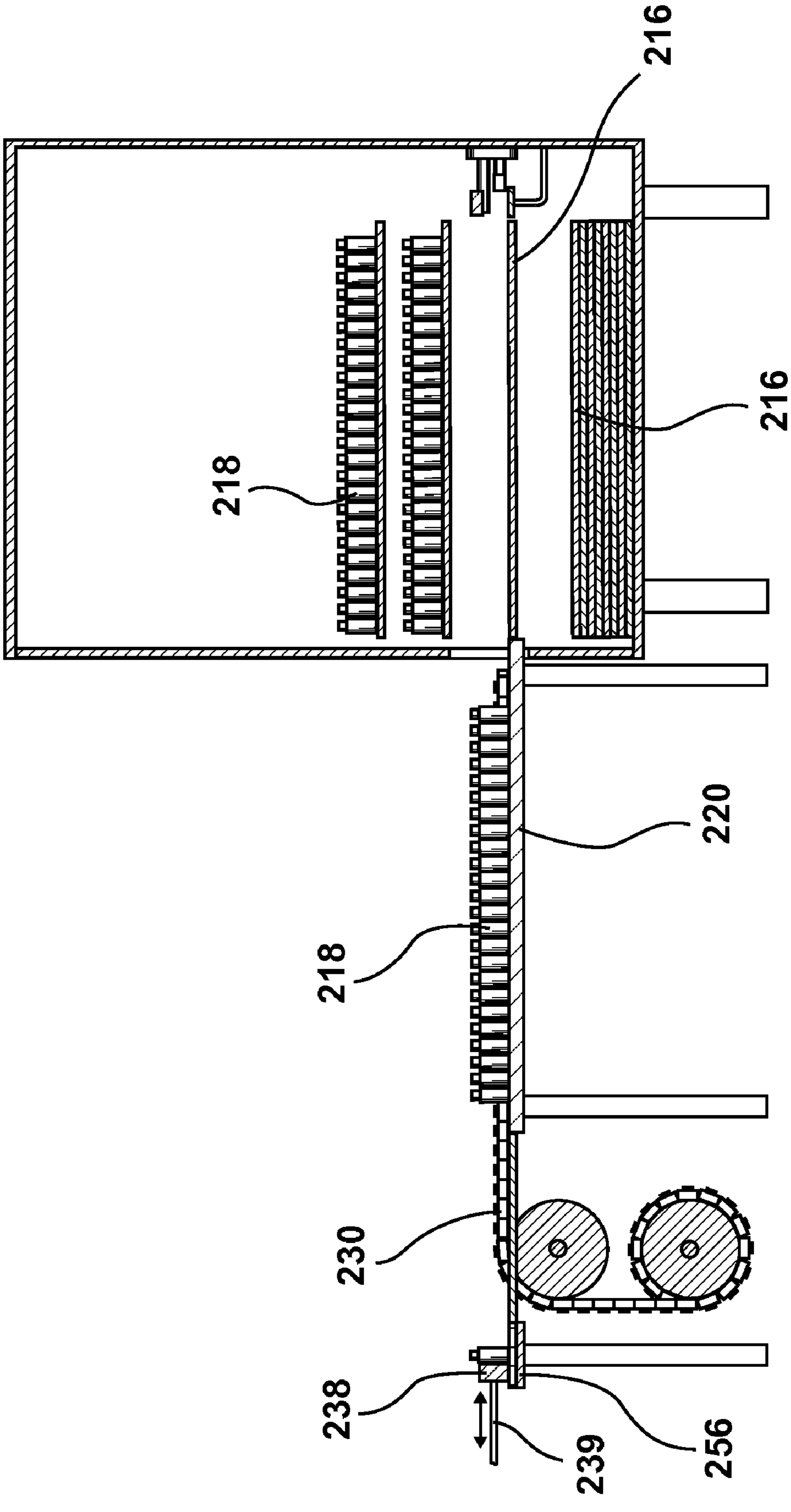
FIG. 12*a* is a schematic sectional side view of a second embodiment of an apparatus of the disclosure and of a freeze drying plant at a first time period.
Figure 12B:
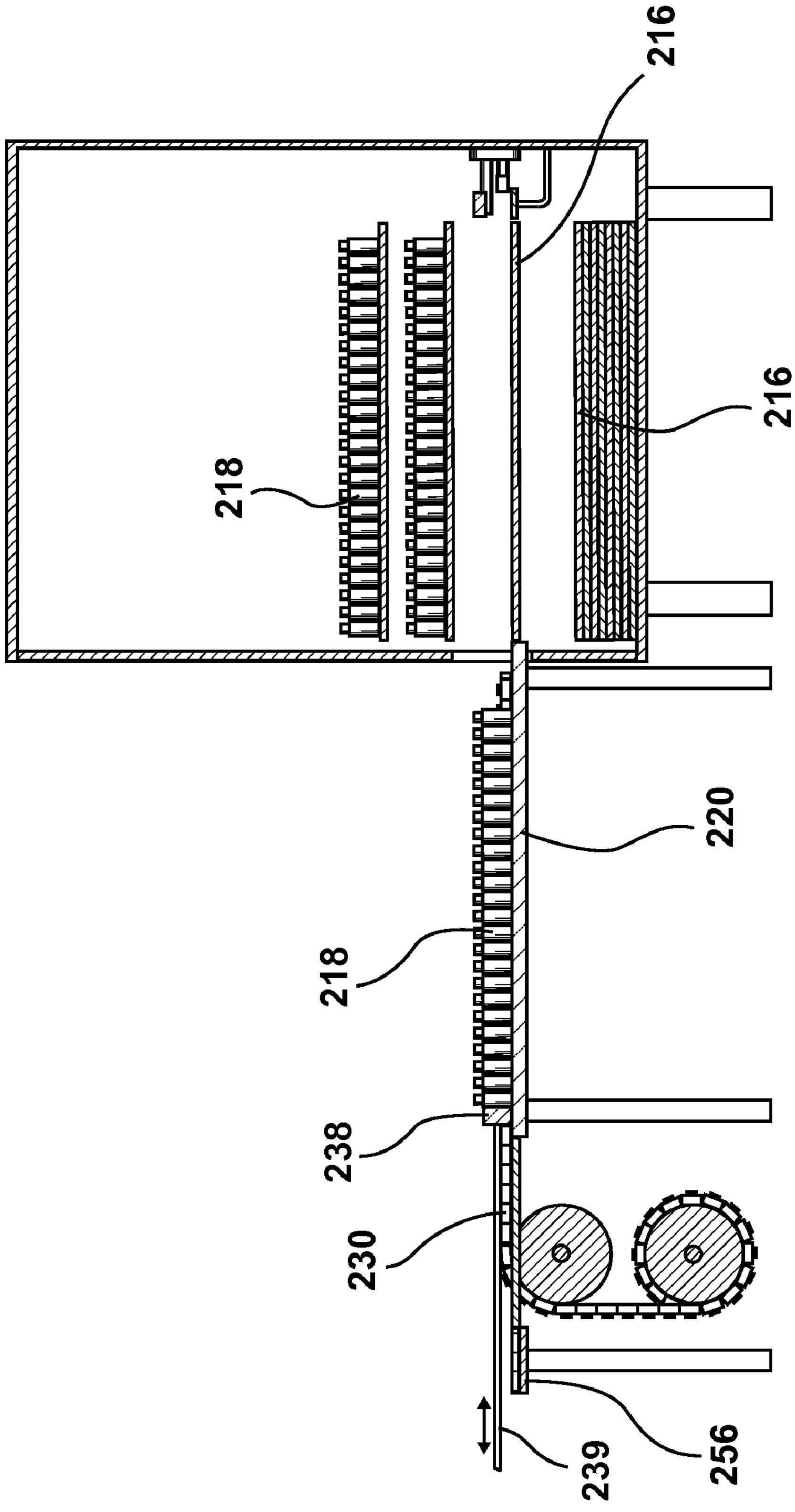
FIG. 12*b* shows the apparatus as shown in FIG. 12*a* at a second time period.
Figure 12C:
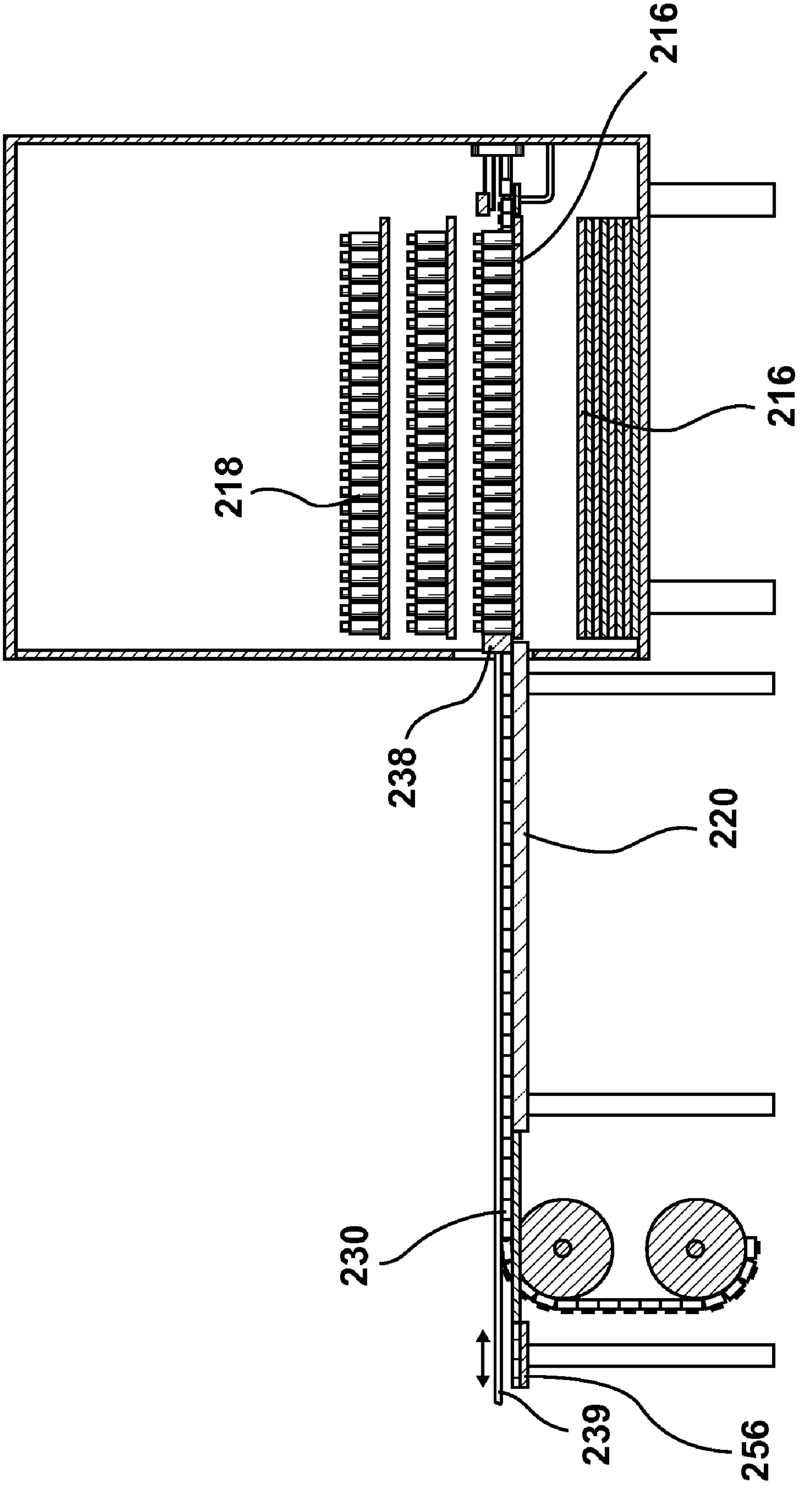
FIG. 12*c* shows the apparatus as shown in FIG. 12*a* at a second time period.
Figure 13A:
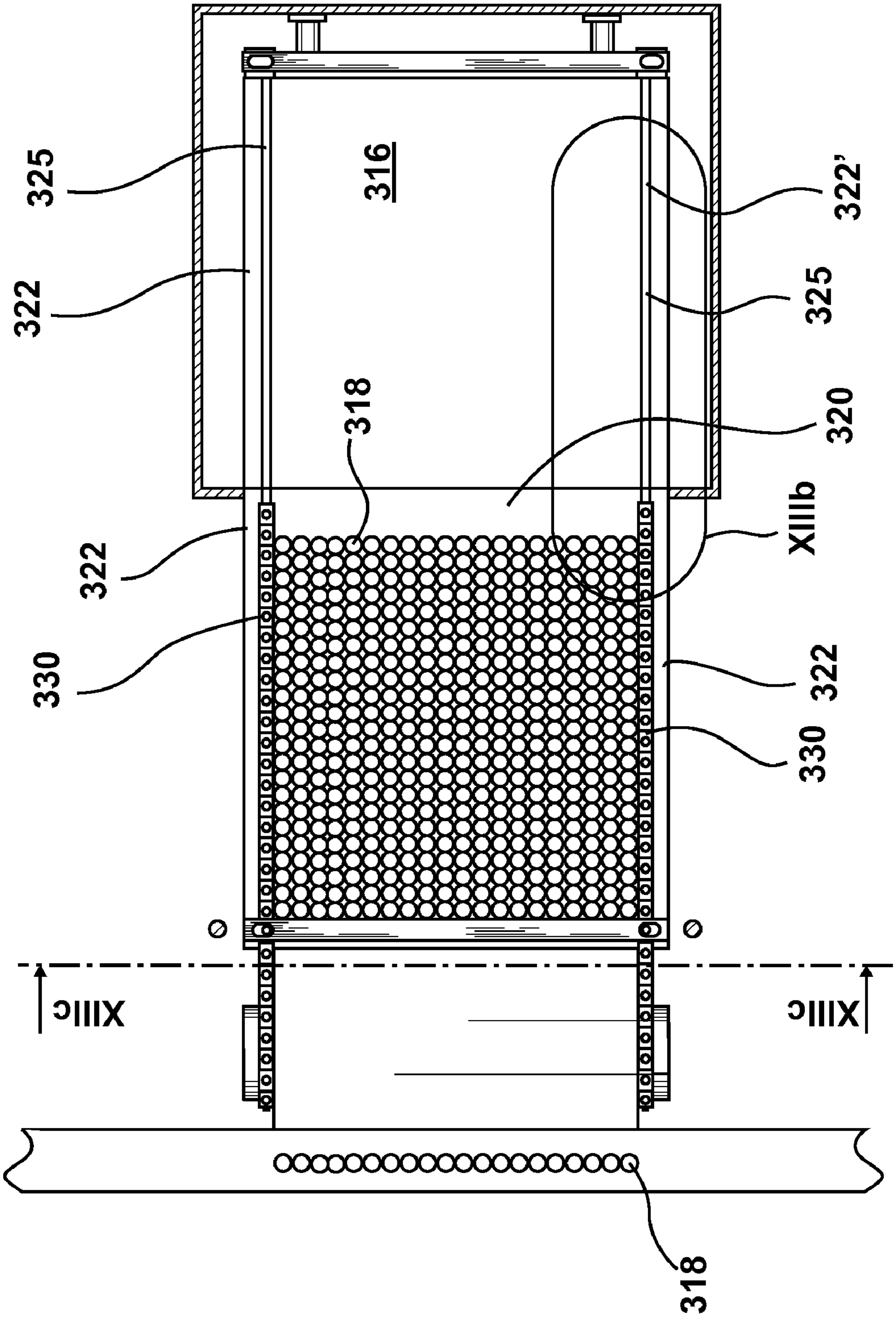
FIG. 13*a* is a schematic sectional top view of a third embodiment of an apparatus of the disclosure and of a freeze drying plant at a first time period, taken along line XIIIa-XIIIa in FIG. 13*c;*
Figure 13B:
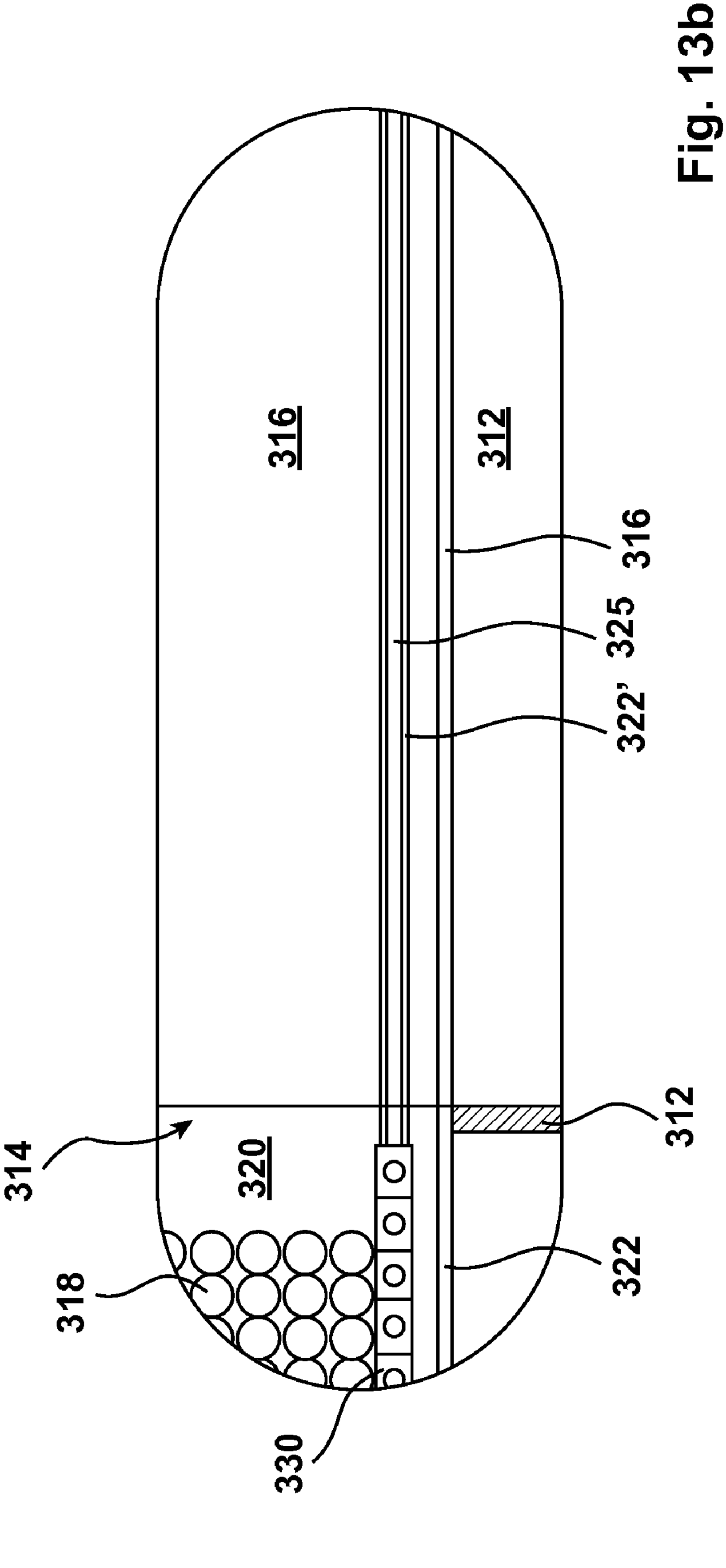
FIG. 13*b* shows an enlarged detail of the apparatus of the disclosure as shown in FIG. 13*a*, taken along line XIIIb in FIG. 13*a;*
Figure 13C:
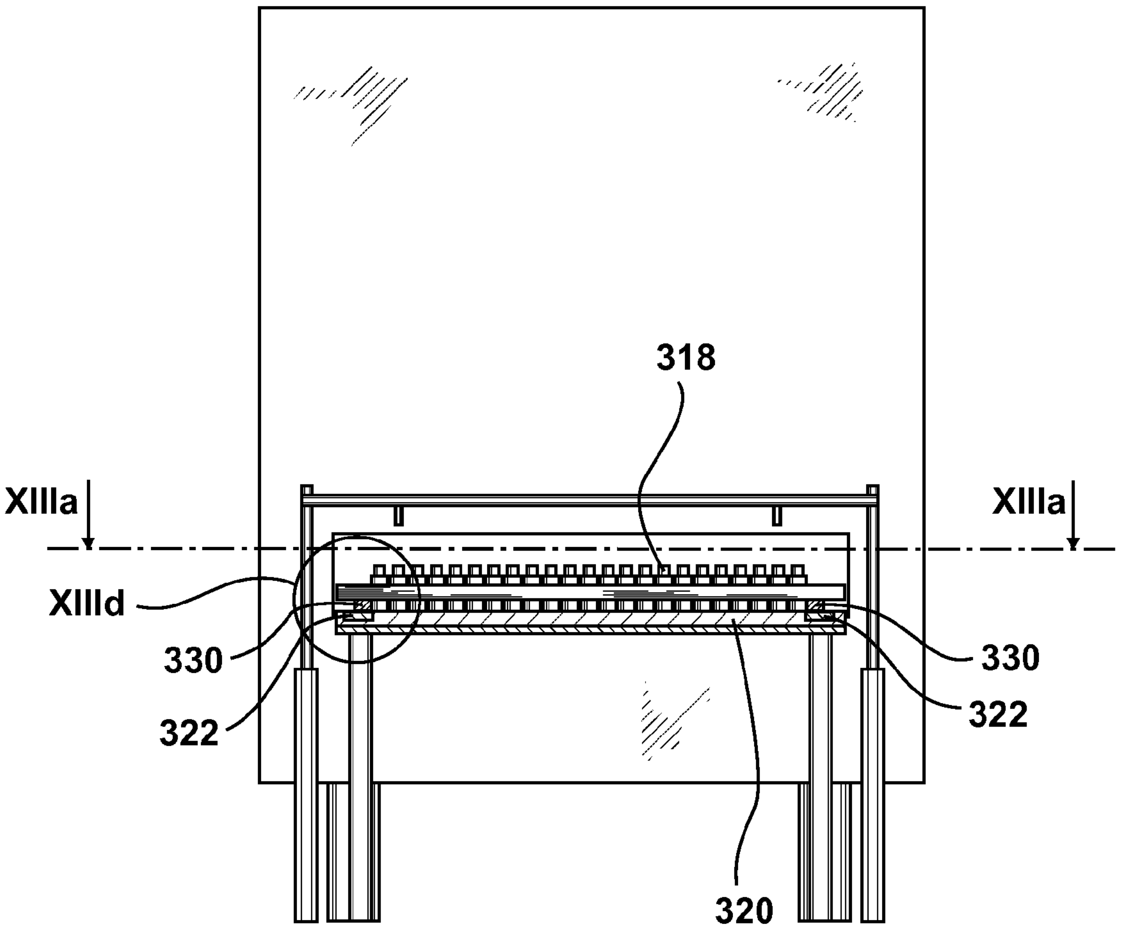
FIG. 13*c* is a sectional front view of the apparatus and the freeze drying plant shown in FIG. 13*a*, taken along line XIIIb-XIIIb in FIG. 13*a;*
Figure 13D:
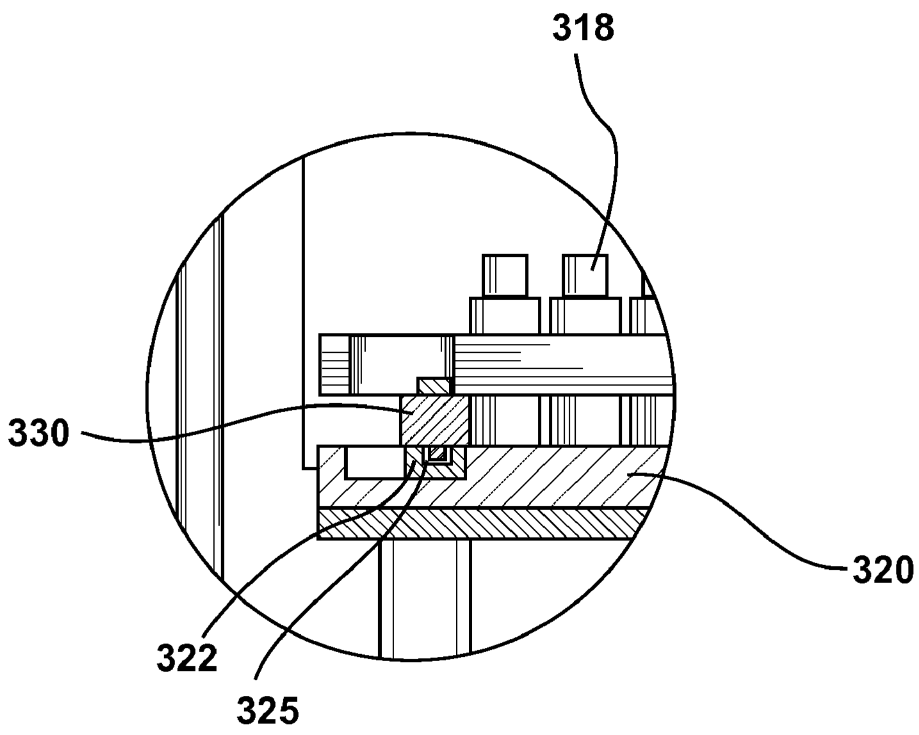
FIG. 13*d* is a sectional view of an enlarged detail of the disclosure as shown in FIG. 13*c*, taken along line XIIId-XIIId in FIG. 13*c*, at a first time period.
Figure 13E:
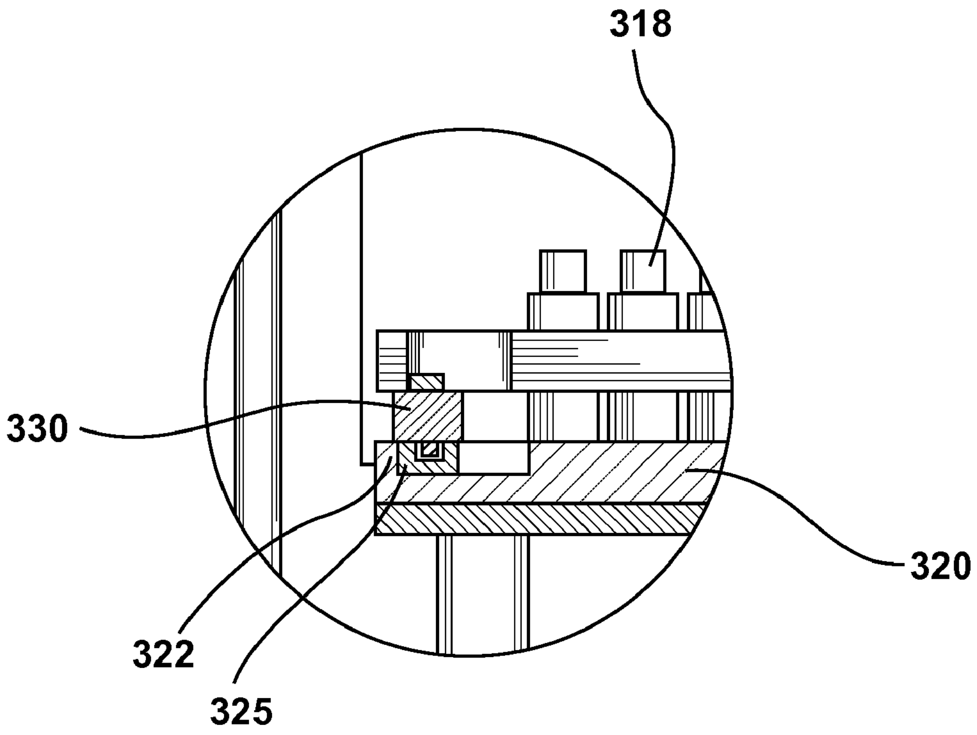
FIG. 13*e* shows the enlarged detail of FIG. 13*d*, at a second time period.
Figure 14A:
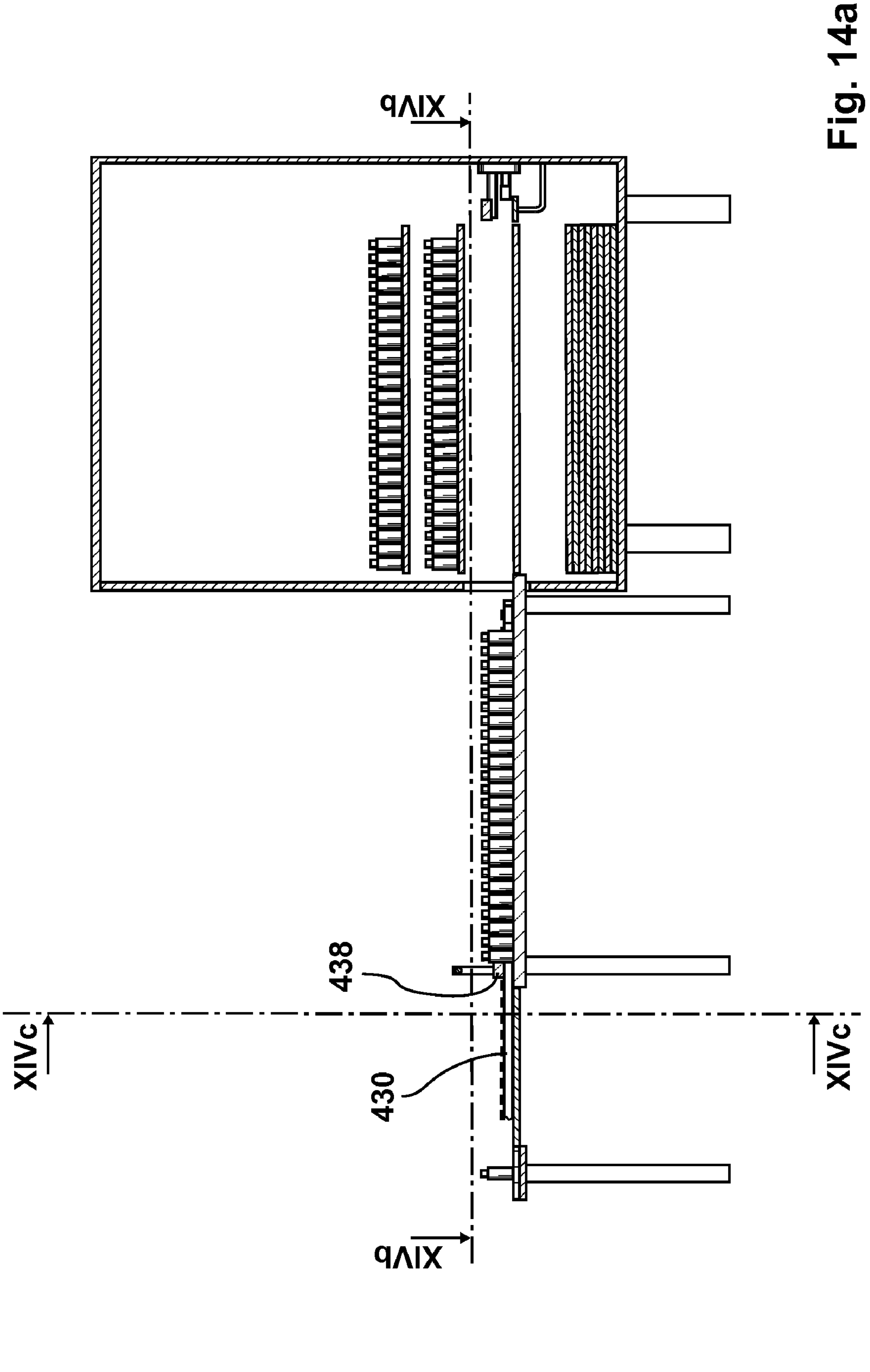
FIG. 14*a* is a schematic sectional side view of a fourth embodiment of an apparatus of the disclosure and of a freeze drying plant at a first time period, taken along XIVa-XIVa in FIG. 14*b;*
Figure 14B:
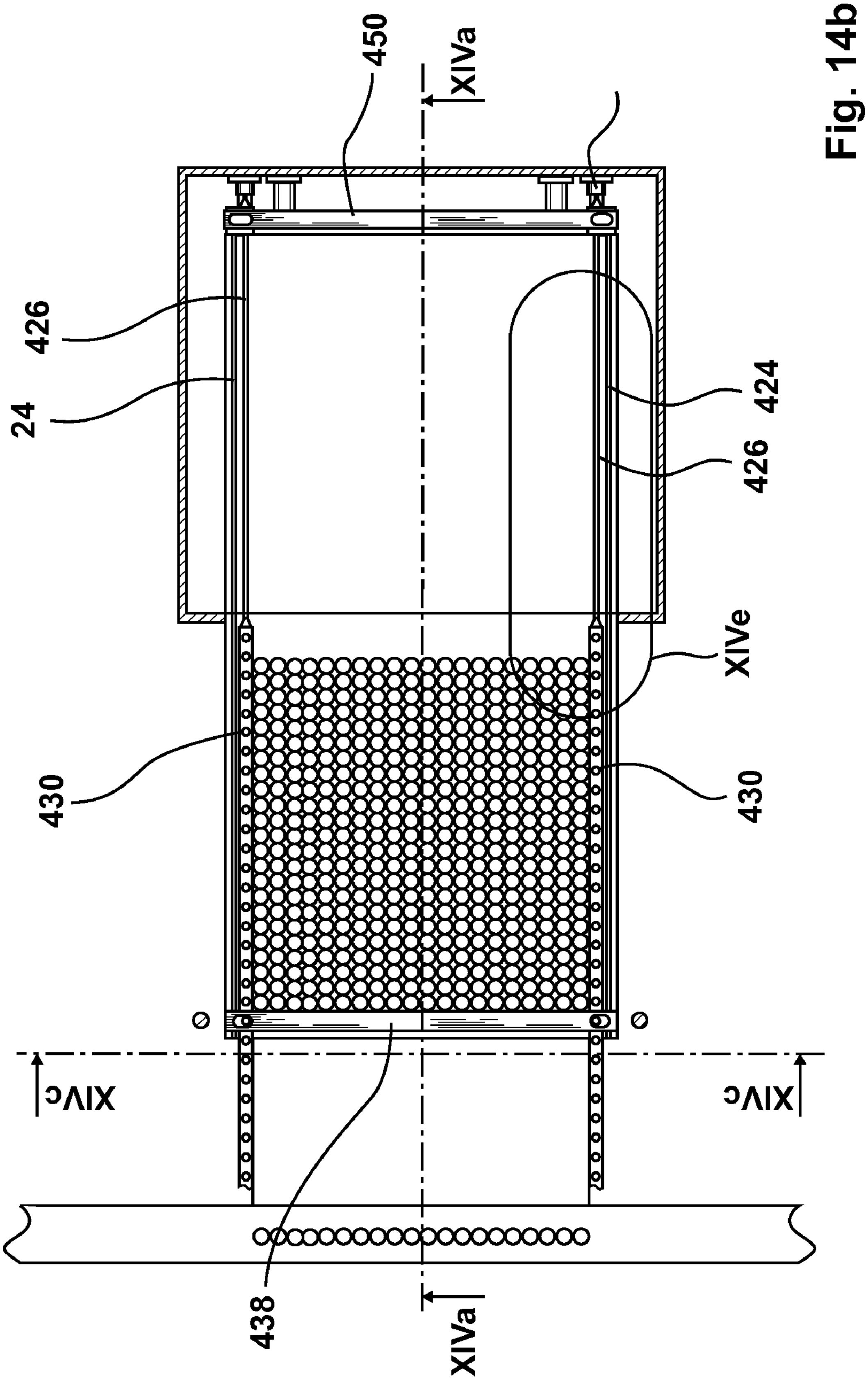
FIG. 14*b* is a sectional top view of the apparatus and of the freeze drying plant as shown in FIG. 14*a*, taken along line XIVb-XIVb in FIG. 14*a;*
Figure 14C:
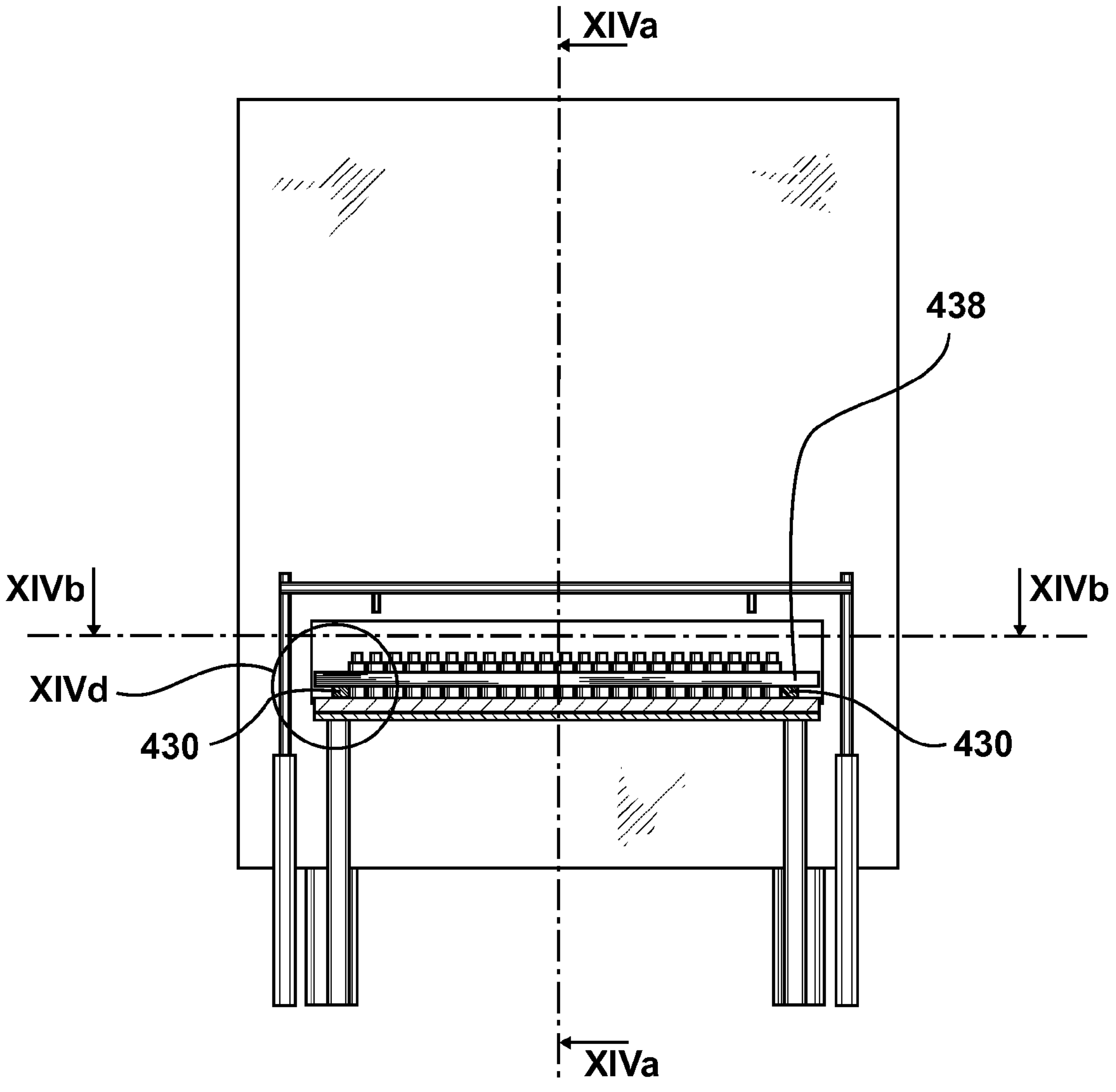
FIG. 14*c* is a sectional front view of the apparatus and of the freeze drying plant shown in FIG. 14*a*, taken along line XIVc-XIVc in FIG. 14*a;*
Figure 14D:
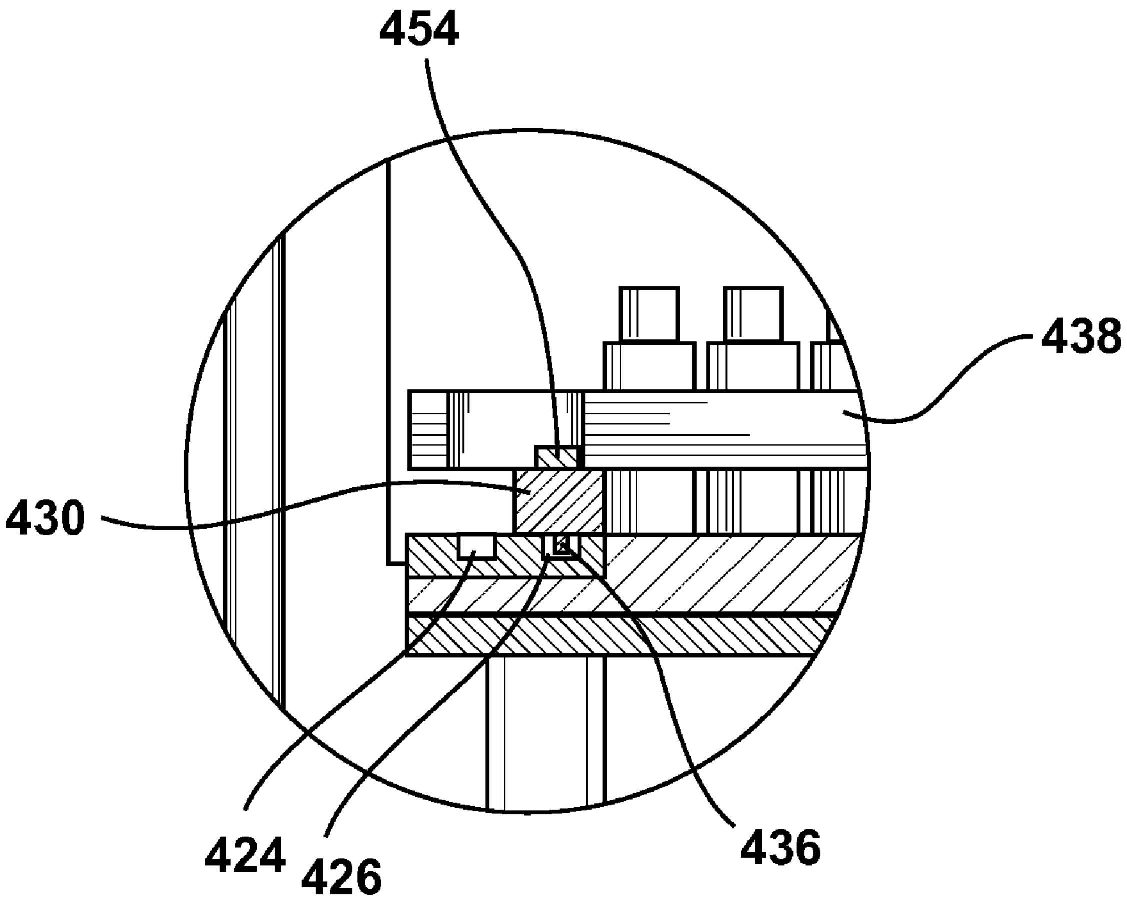
FIG. 14*d* shows an enlarged detail of the apparatus of the disclosure as shown in FIG. 14*a*, taken along line XIVd in FIG. 14*c;*
Figure 14E:
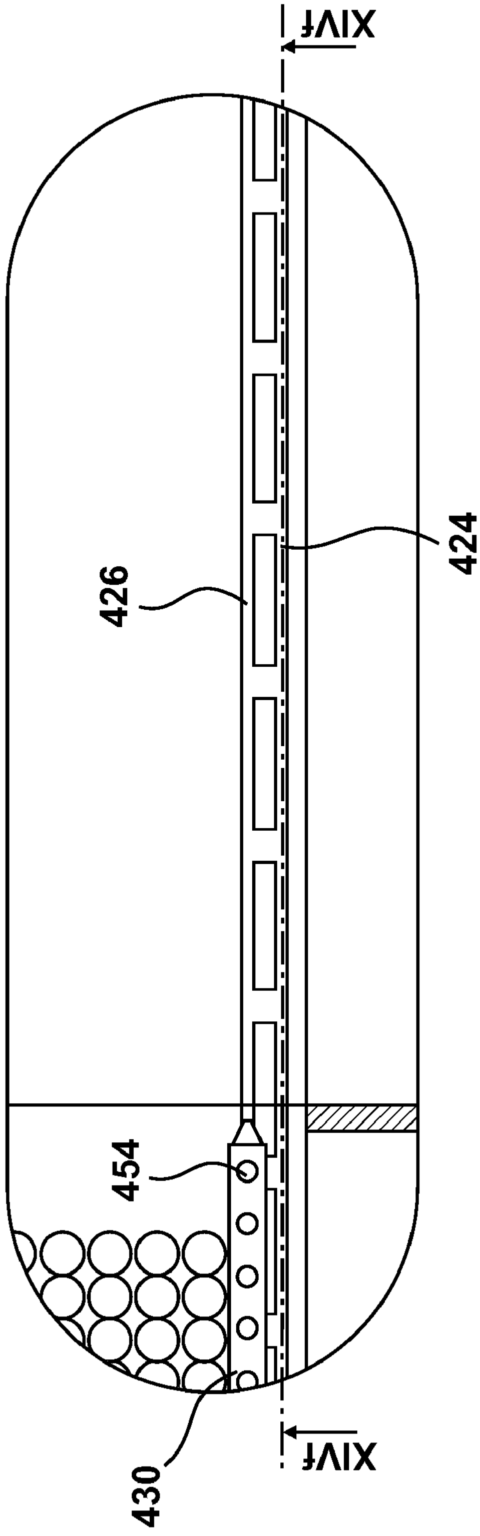
FIG. 14*e* shows an enlarged detail of the apparatus of the disclosure as shown in FIG. 14*a*, taken along line XIVe in FIG. 14*c;*
Figure 14F:
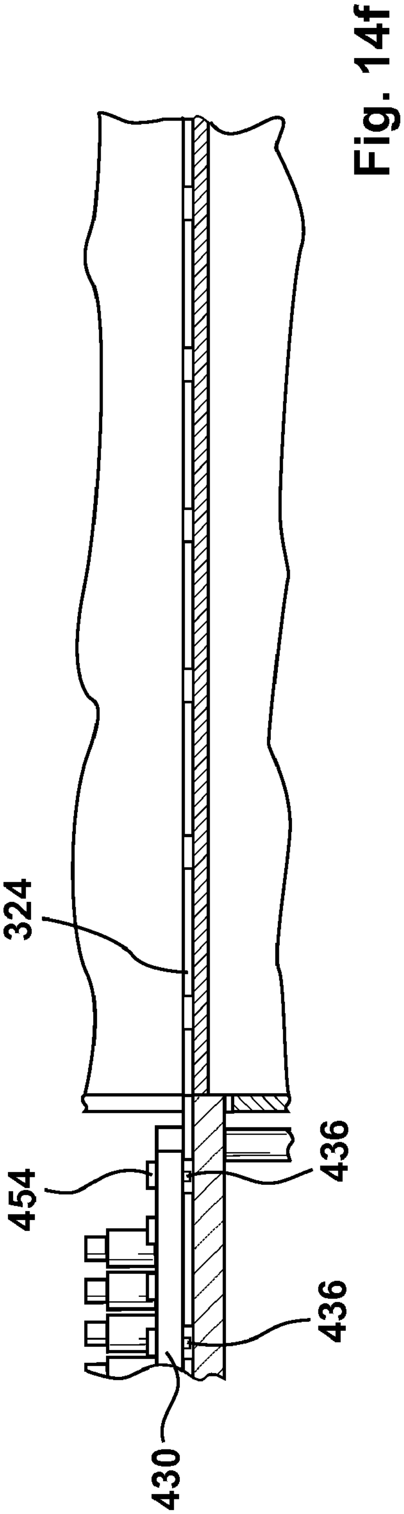
FIG. 14*f* is a sectional side view of an enlarged detail as shown in FIG. 14*e*, taken along line XIVf-XIVf in FIG. 14*e*.

The FIGS. 12*a* through 12*c* schematically show a second embodiment of an apparatus of the disclosure. This second embodiment only differs from the first embodiment shown in the FIGS. 1*a* through 1*f* by the fact that a pusher 238 is utilized for pushing the vials 218 instead of the loading pusher. This pusher 238 is caused to move by a separate apparatus that has not been illustrated herein, said apparatus being connected to the actual pusher 238 through a connecting rod 239. This pusher extends over the entire width of the transfer table 220, meaning from the left pusher chain 230 to the right pusher chain 230. As can be seen from FIG. 12*a* in particular, the vials 218 are delivered through the feeding device 256. From there, the vials 218 are pushed by the pusher 238 onto the transfer table 220. As soon as enough vials 218 have gathered on the transfer table, the pusher 238 acts onto the foremost vials 218 and pushes all of the vials 218 located on the transfer table 220 onto the tray 216, as can be seen from the FIGS. 12*b* and 12*c*. The pusher chains 230 are thereby driven forward at the same speed as the pusher 238 for no friction to occur between the pusher chains 230 and the vials 218 abutting thereon so that no vials 218 will tip over and for the vials 218 to arrive on the tray 216 in the given classification. For the rest, this second embodiment is identical with the first embodiment shown in the FIGS. 1*a* through 1*f* and described herein above.

In the FIGS. 13*a* through 13*e*, there is schematically illustrated a third embodiment of an apparatus of the disclosure. This third embodiment differs from the first embodiment shown in the FIGS. 1*a* through 1*f* by the mere fact that the guide element 322 retained on the transfer table 320 and the guide element 322' retained on the tray 316 only comprises one single guiding groove 325 and that no centering apparatus is provided. Instead, the guiding elements 322 and 322' are retained for lateral displacement on the transfer table 320 and on the tray 316, said guiding elements 322 and 322' being displaceable towards the right and towards the left by 1 mm through 30 mm, preferably by 15 mm, so that the transport carriage, which is configured to be a pusher chain 330, can be spaced apart from the vials 318 at need. This preferably occurs whenever the pusher chain 330 has to make an empty run in order for it to get spaced from the vials 318 normally abutting the pusher chain 330 so that these vials 318 will not inadvertently tip over or become displaced from their original position. The laterally slidable guiding elements 322 and 322' are thereby operated by a pneumatic control. For the rest, this third embodiment is identical with the first embodiment illustrated in the FIGS. 1*a* through 1*f* and described herein above.

In the FIGS. 14*a* through 14*f*, there is schematically shown a fourth embodiment of an apparatus of the disclosure. This fourth embodiment merely differs from the first embodiment shown in the FIGS. 1*a* through 1*f* by the fact that a rod 430 is utilized instead of the pusher chain. Like the pusher chain, this rod 430 is guided in the inner groove 426 or in the outer groove 424 via guiding pins 436 and has on its upper side pins 454 for receiving the loading pusher 438 and the unloading pusher 450. For the rest, this fourth embodiment is identical with the first embodiment illustrated in the FIGS. 1*a* through 1*f* and described herein above.

| List of Numerals: | |
|---|---|
| 10 | Freeze drying plant |
| 12 | Chamber |
| 14 | Opening |
| 16, 216, 316 | Tray |
| 18, 218, 318 | Vial |
| 20, 220, 320 | Transfer table |
| 22, 322 | Guiding element |
| 22', 322' | Guiding element |
| 24, 424 | Outer groove |
| 26, 426 | Inner groove |
| 28 | Connecting groove |
| 30, 230, 330 | Pusher chain |
| 430 | Rod |
| 32 | Cylinder |
| 34 | Deflection pulley |
| 36, 436 | Guiding pin |
| 38, 438 | Loading pusher |
| 238 | Pusher |
| 40 | Shelf |
| 42 | Long hole |
| 44 | Centering apparatus |
| 45 | Supporting table |
| 46 | Head |
| 48 | Retaining mechanism |
| 50, 450 | Unloading pusher |
| 52 | Long hole |
| 54, 454 | Pin |
| 56 | Feeding device |
| 58 | Tongs |

We claim:

1. An apparatus for loading and unloading a tray of a freeze drying plant with a number of vials, the apparatus comprising:

a transfer table upstream of the freeze drying plant for receiving temporarily said vials; and a pusher apparatus for displacing said vials from said transfer table to said tray or from said tray to said transfer table, said pusher apparatus including a right and a left transport carriage and a loading element, wherein each transport carriage is displaceable transverse to its travel direction.

2. The apparatus as set forth in claim 1, further comprising a respective guide element disposed on a right and on a left border of at least one of the transfer table or the tray, wherein the transport carriage rests on the guide element and projects upward beyond at least one of the transfer table or the tray to form a lateral limitation of at least one of the transfer table or the tray.

3. The apparatus as set forth in claim 2, wherein the guide element extends as far as a rear border of the tray.

4. The apparatus as set forth in claim 2, wherein the guide element includes a guiding groove for a downward extending guide pin of the transport carriage to engage.

5. The apparatus as set forth in claim 4, wherein the guide element is retained on at least one of the transfer table or the tray for lateral displacement by about 1 mm to about 30 mm.

6. The apparatus as set forth in claim 2, wherein the guide element includes an inner groove and an outer groove for a downward extending guide pin of the transport carriage to engage.

7. The apparatus as set forth in claim 6, wherein the outer groove is arranged substantially parallel to the inner groove.

8. The apparatus as set forth in claim 6, wherein the inner groove is connected to the outer groove through two connecting grooves.

9. The apparatus as set forth in claim 6, wherein the transport carriage includes at least two guide pins that are located in a region of the connecting grooves when the transport carriage is extended.

10. The apparatus as set forth in claim 6, further comprising a centering apparatus for displacing a head of the transport carriage, said centering apparatus being disposed in the freeze drying plant behind the tray to be loaded.

11. The apparatus as set forth in claim 2, wherein the transport carriage is a pusher chain.

12. The apparatus as set forth in claim 2, wherein the transport carriage is a rod.

13. The apparatus as set forth in claim 2, wherein the loading element is a loading pusher.

14. The apparatus as set forth in claim 2, wherein the loading element is a pusher.

15. A method of loading or unloading a tray of a freeze drying plant with a number of vials, the method comprising:

moving a transport carriage away from the vials during an empty run;

moving the transport carriage toward the vials during a pusher run;

using a centering apparatus behind the tray to take hold of a head of the transport carriage; and transferring, using the centering apparatus, the head from an inner groove to an outer groove of a guide element.

16. A method as defined in claim 15, further comprising moving the transport carriage at the same speed as a loading element.

17. An apparatus for loading and unloading a tray of a freeze drying plant with a number of vials, the apparatus comprising:

a transfer table upstream of the freeze drying plant for receiving said vials;

a pusher apparatus for displacing said vials from said transfer table to said tray or from said tray to said transfer table, said pusher apparatus including a right and a left transport carriage and a loading element, wherein the transport carriages are disposed on at least one of said transfer table or said tray to form a lateral limitation of at least one of said transfer table or said tray during the loading or unloading; and a respective guide element disposed on a right and a left border of at least one of the transfer table or the tray, wherein the transport carriage rests on the guide element and projects upward beyond at least one of the transfer table or the tray to form the lateral limitation, wherein the guide element includes an inner groove and an outer groove for a downward extending guide pin of the transport carriage to engage.

18. The apparatus as set forth in claim 17, wherein the guide element extends as far as a rear border of the tray.

19. The apparatus as set forth in claim 17, wherein the guide element includes a guiding groove for a downward extending guide pin of the transport carriage to engage.

20. The apparatus as set forth in claim 17, wherein the inner groove is connected to the outer groove through at least two connecting grooves.

21. The apparatus as set forth in claim 17, wherein the transport carriage is a pusher chain.

* * * * *